United States Patent [19]

Kamide et al.

[11] Patent Number: 4,634,332
[45] Date of Patent: Jan. 6, 1987

[54] AUTOMATIC CONTROL SYSTEM FOR A LOADING AND UNLOADING VEHICLE

[75] Inventors: Takao Kamide, Hiratsuka; Norio Ueda; Akira Nemoto, both of Tokyo, all of Japan

[73] Assignees: Kabushiki Kaisha Komatsu Seisakusho; Komatsu Fork Lift Co. Ltd., both of Tokyo, Japan

[21] Appl. No.: 3,685

[22] Filed: Jan. 15, 1979

Related U.S. Application Data

[63] Continuation of Ser. No. 730,882, Oct. 8, 1976, abandoned.

[30] Foreign Application Priority Data

Oct. 15, 1975 [JP]  Japan .................. 50-123944

[51] Int. Cl.$^4$ .................. B66G 1/00; B61J 3/00
[52] U.S. Cl. .................. 414/273; 104/88
[58] Field of Search .................. 414/266–267, 414/273–275, 277, 279, 281–284, 134–136; 104/88; 246/29–30, 194; 180/98

[56] References Cited

U.S. PATENT DOCUMENTS

| | | | |
|---|---|---|---|
| 2,847,080 | 8/1958 | Zwerykin et al. | 180/98 |
| 3,147,817 | 9/1964 | Liban | 180/98 |
| 3,245,493 | 4/1966 | Barrett | 180/98 |
| 3,406,846 | 10/1968 | O'Connor . | |
| 3,486,640 | 12/1960 | Lemelson . | |
| 3,519,150 | 7/1970 | Kennon et al. | 414/284 |
| 3,669,206 | 6/1972 | Tax et al. | 180/98 |
| 3,734,226 | 5/1973 | Comer | 180/98 |
| 3,933,099 | 1/1976 | Sieb | 104/88 |
| 4,015,536 | 4/1977 | Sato | 180/98 |

FOREIGN PATENT DOCUMENTS 1008071 10/1965 United Kingdom .

Primary Examiner—Trygve M. Blix
Assistant Examiner—R. Johnson
Attorney, Agent, or Firm—Ladas & Parry

[57] ABSTRACT

An automatic control system for a vehicle such as a fork lift truck automates the transportation, loading and unloading operations of the vehicle in a work area. Leader cables disposed in the work area are supplied with instruction signals of respectively different frequencies from terminal units in response to commands from a central control device. Any cable or a combination of two cables forms a ehicle guideway along which the travel of the vehicle is controlled by instruction signal pickup coils on the vehicle and along which loading and unloading stations for the vehicle are located. Loading and unloading are effected without using the leader cables, the necessary instruction signals then being received from the central control device by the vehicle from a coil disposed at the loading and unloading station.

7 Claims, 27 Drawing Figures

FIG. 8
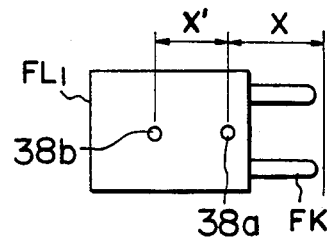
FIG. 9
(a)
<UNLOADING>
$H_2 = LH + h$
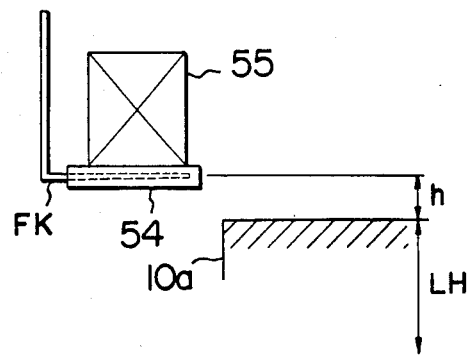
(b)
<LOADING>
$H_2 \doteq LH$
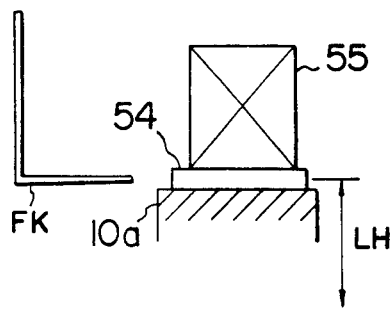

1

AUTOMATIC CONTROL SYSTEM FOR A LOADING AND UNLOADING VEHICLE

This is a continuation of application Ser. No. 730,882 filed Oct. 8, 1976 now abandoned.

BACKGROUND OF THE INVENTION

This invention relates to an automatic control system for a loading and unloading vehicle such as a fork lift truck.

The working of cargo or goods in a work area such as a factory or a warehouse has conventionally been carried out by conveying cargo or goods along stationary conveying means such as a conveyor belt and loading or unloading the cargo or goods by hand at a required place or be a loading and unloading machine fixedly provided at such place.

There is also known a loading and unloading system employed in an operatorless warehouse or factory according to which rows of racks are concentrated in a certain limited area cargo or goods are loaded on or unloaded from these racks by means of stack cranes which travel back and forth along respective rows of the racks. This system however has a drawback that the cargo or goods must be carried to and from the stack cranes by other transporting means. Besides, the concentrated provision of racks in one area imposes a limitation to the use of space in the warehouse or factory.

SUMMARY OF THE INVENTION

It is an objct of the present invention to provide an automatic control system for a loading and unloading vehicle capable of implementing a completely automatic working of cargo work or goods including loading and unloading thereof as well as transportation thereof on the basis of a novel principle which is entirely different from the conventional methods. According to the present invention, a loading and unloading vehicle such as a fork lift truck is driven automatically in a work area so as to convey cargo or goods to or from a required loading and unloading place such, for example, as a rack or a working table and load or unload the cargo or goods at such required place. Thus, a complete automatization including loading and unloading as well as transportion of cargo or goods is achieved. Further, according to the invention, the loading and unloading vehicle is run along a course which can be provided as desired. This is advantageous because the loading and unloading places such as racks need not be concentrated in one location as has heretofore been practiced but can be disposed at any desired location with a result that space in a warehouse, factory etc. can be most efficiently utilized.

BRIEF DESCRIPTION OF THE DRAWINGS

Further objects and advantages of the present invention can be more fully understood from the following detailed description taken in conjunction with the accompanying drawings in which:

FIG. 6(c) is a schematic view of the relationship between the coil at the station and the fork lift truck;

FIG. 8 is a schematic plan view of the fork lift truck with attached first and second set position detection sensors for illustrating the mounting positions of the sensors to the lift truck;

FIGS. 9(a) and 9(b) are schematic elevational view for explaining the relationship between the load to be loaded or unloaded and the height of the fork of the lift truck to designate the fork engaging height $H_2$ of the fork when the load is loaded and unloaded to and from the lift truck;

DESCRIPTION OF THE PREFERRED EMBODIMENTS

To have better understanding of this invention respective parts and components of the preferred embodiment shown in the accompanying drawings will be described in different sections.

For convenience of explanation, in the embodiments of the present invention as will be hereinbelow described, a conventional fork lift truck is used as a loading and unloading vehicle when carries control devices and elements and detectors such as coils necessary for the unmanned or operatorless cargo work including travelling and loading and unloading operations of the lift truck. A leader cable is provided along a predetermined course of the fork lift truck within the cargo work areas as means for guiding the lift truck along the course without an operator thereon. The cargo work area or sample work area generally means in the specification the entire space such as a warehouse, factory region, storage places of cargo and goods in a factory, etc., where goods are loaded and unloaded to and from a vehicle and the laden goods are transported back and forth for the disposal of the goods. One or more pickup coils are provided on the fork lift truck for controlling the travel of the lift truck along the leader cable in the work area. Stations are provided along the course defined by of the leader cable at desired places where the goods or loads will be selectively loaded and unloaded to and from the lift truck without an operator. When the fork lift truck thus travelling along the leader cable under the control of a pickup coil or coils without the operator reaches the desired station, the control of the truck along the leader cable is stopped. The fork lift truck in travel along a path no longer defined by the leader cable, the control being programmed in accordance with a preset or predetermined loading and unloading sequence. The loading and unloading of the goods are conducted in the order of this sequence without an operator. When the loading and unloading is finished, the truck will return to and again start from the station, and will then be run along the leader cable-defined course under pickup coil control of the leader cable toward a station for loading and unloading other goods.

THE OVERALL CONSTRUCTION

Figure 1:
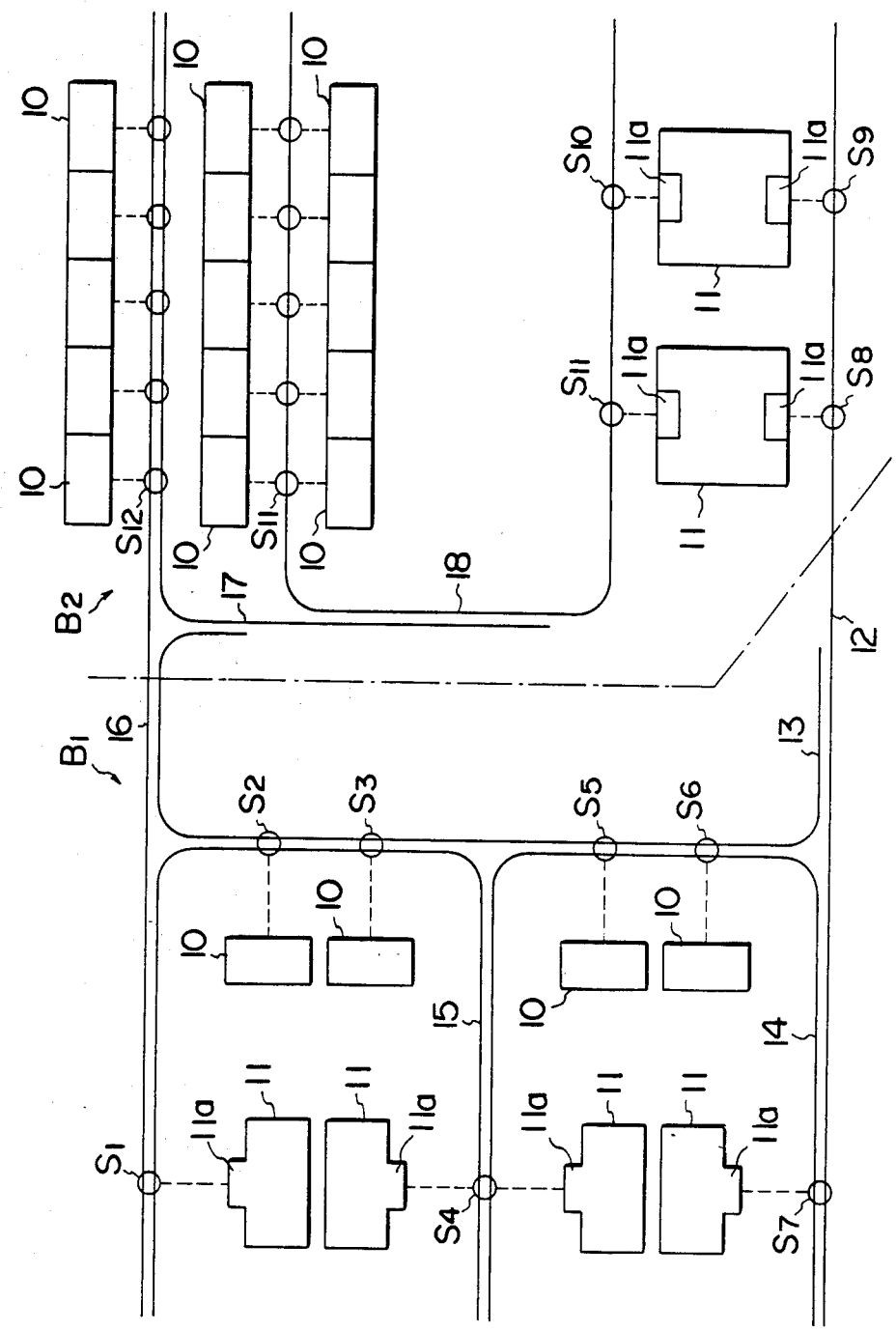
FIG. 1 is a schematic plan view of one example of an unmanned or operatorless cargo work area in which the present invention may be employed.

FIG. 1 is a plan view of one example of the cargo work area in which the present invention may be employed, showing the disposition and arrangements of racks 10, machine tools 11 and leader cables 12, 13, 14, 15, 16, 17 and 18. Driving or driver power supplies (not shown) are selectively connected separately and independently to the respective leader cables 12 through 18 as will be hereinafter described in greater detail, which cables are provided along the travelling course of the fork lift truck (now shown). A course along which any two or more of a plurality of cables 12 through 18 run is illustrated in such a manner that these cables run in parallel since it is convenient for showing branching courses as will be hereinbelow described in greater detail. Stations $S_1$, $S_2$, $S_3$ ... are provided at spots of the course corresponding to exits 11a of machine tools 11 and racks 10 where goods are loaded or unloaded. In the example shown in FIG. 1, the positions of the stations $S_1$, $S_2$, $S_3$ ... which are illustrated by small circles are constructed of station coils as will hereinafter be described in greater detail with reference to FIGS. 6(a) to 6(c). The racks 10 are formed as a plurality of shelves.

In FIG. 1, routes depicted by broken lines connecting the respective stations $S_1$, $S_2$, $S_3$ ... with the respective racks 10 and machine tools 11 illustrate schematically the departure of the fork lift truck from the leader cables for loading or unloading the respective racks 10 or machine tools 11 in accordance with the loading and unloading sequence after the fork lift truck is released from its control by signal picked up from the leader cables. There is provided one operation command and position confirmation coil 27 for each station at the loading and unloading position, as will be described more fully hereinafter with reference to FIG. 7.

Figure 2:
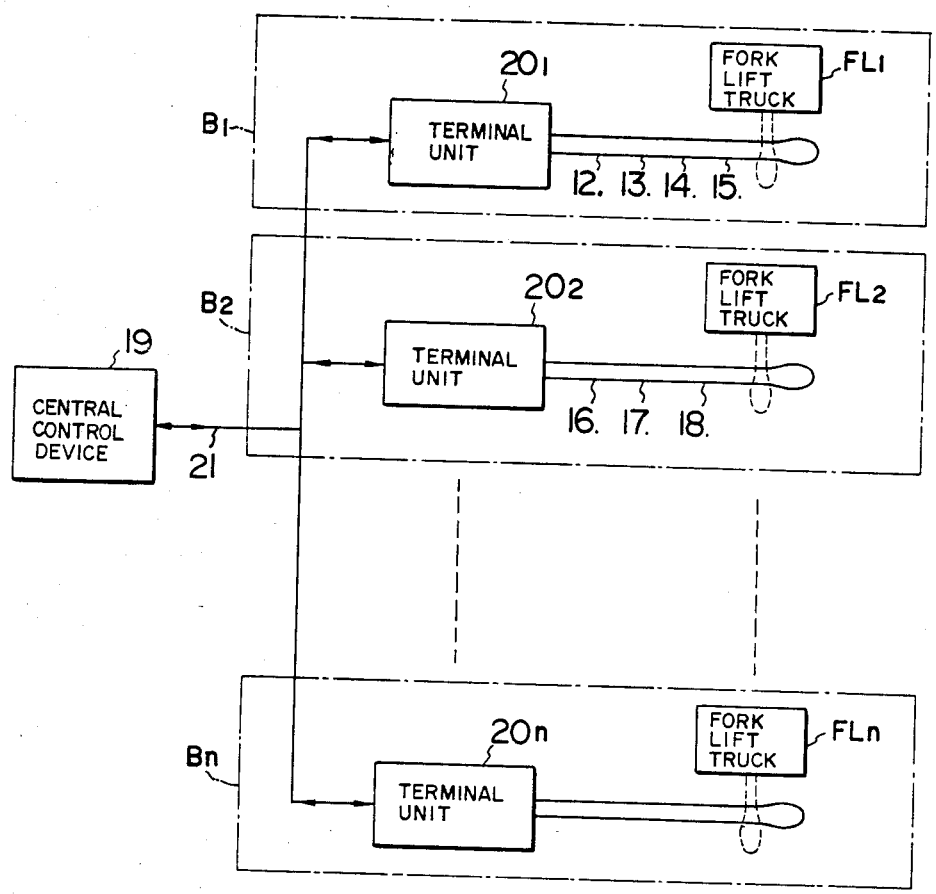
FIG. 2 is a block diagram of the control system of an embodiment of this invention showing the concept of the block control.

FIG. 2 is a block diagram showing an example of the control system according to the present invention. In this embodiment, "a block control" system is adopted as will hereinafter be described in greater detail, according to which system the entire braod work area is divided into a plurality of blocks $B_1$ through $B_n$ with one central control device 19 such, for example, as an electronic computer, separately controlling the respective blocks $B_1$ through $B_n$.

The respective blocks $B_1$ through $B_n$ comprise terminal units $20_1$ through $20_n$. Data are transmitted and received between the central control device 19 and the respective terminal units $20_1$ through $20_n$ through data transmission lines 21, which may be of any data transmission type such as with wire or wireless radio transmission. Information such as travelling route or course, stopping stations, loading and unloading commands, rack height commands (such as the designations of the number of shelf or shelves for loading or unloading) and other information neccessary for the transportation and loading and/or unloading is transmitted from the central control device 19 through the data transmission lines 21 to the respective terminal units $20_1$ through $20_n$ in accordance with the program. The terminal units $20_1$ through $20_n$ receive for example, abnormal signals transmitted from the fork lift trucks $FL_1$ through $FL_n$, respectively and transmit them to the central control device 19.

The respective terminal units 20 through $20_n$ comprise data transmitter-receiver units transmitting data to and receiving it from the central control device 19, suitable control circuits for interpreting or translating the received data and for controlling a switching operation in response thereto, driving power sources for supplying frequency signals to the respective leader cables 12 through 18, and switching circuits. Accordingly, the respective leader cables provided along the travelling course of the lift truck are connected respectively to the terminal units $20_1$ through $20_n$ in the respective blocks. For example, in the case shown in FIG. 1, assuming that it is divided into two blocks $B_1$ and $B_2$ as indicated by the chain and dot line, the leader cables 12, 13, 14 and 15 belong to the block $B_1$ and are connected to the terminal unit $20_1$, while the cables 16, 17 and 18 belong to the block $B_2$ and are connected to the terminal unit $20_2$.

The terminal units $20_1$ through $20_n$ perform the function of supplying the frequency signal to a predetermined leader cable in response to the command from the central control device 19. One of the fork lift trucks $FL_1$ through $FL_n$ is assigned to each block of the blocks $B_1$ through $B_n$, and is thus caused to travel along the predetermined course under the control of the frequency signal flowing through the leader cable. The contents of the command fed through the leader cable from the terminals $20_1$ through $20_n$ are in the form of frequency. Thus, the frequency of the command is detected or discriminated on the fork lift trucks $FL_1$ through $FL_n$, so that the lift trucks $FL_1$ through $FL_n$ achieve the travelling, loading and/or unloading operations in response to the commands from the central control device 19.

Figure 3:
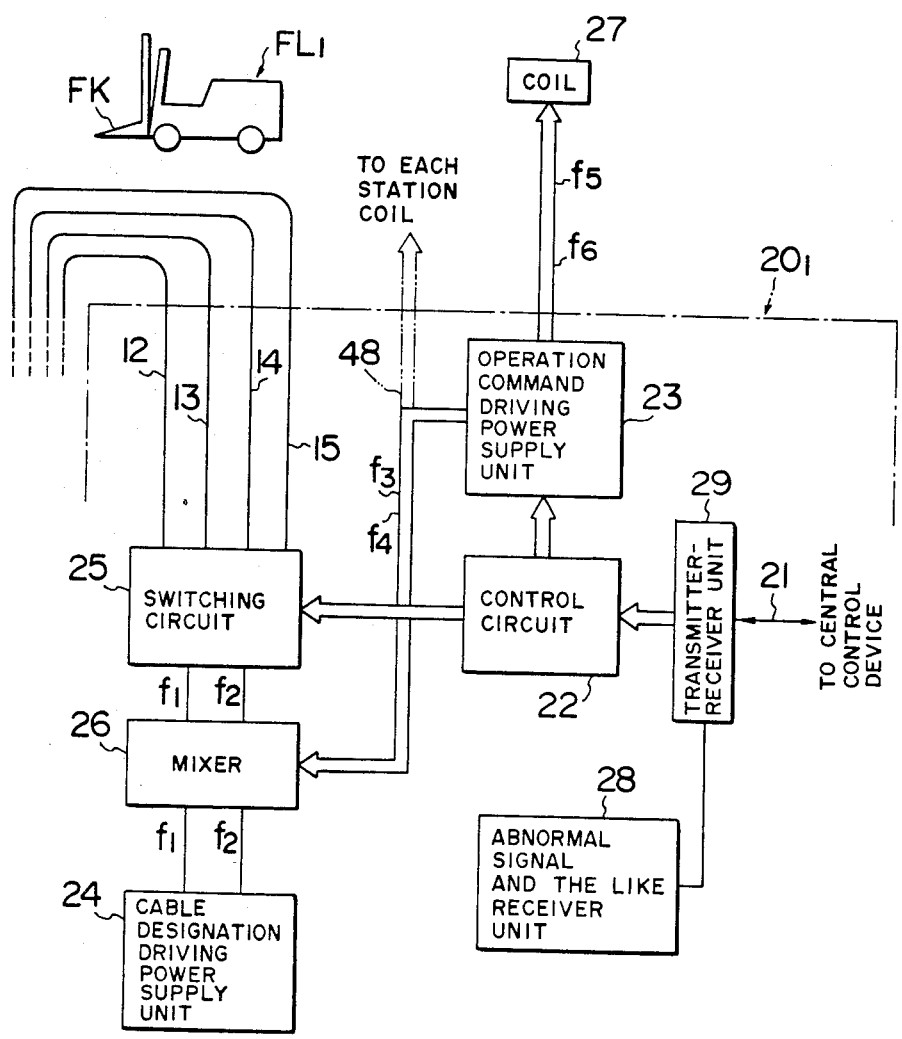
FIG. 3 is a block diagram of one example of the terminal unit used in the aforementioned embodiment of the invention.

One example of the terminal units $20_1$ through $20_n$ in the form of a block diagram is shown in FIG. 3. The terminal unit $20_1$ comprises a control circuit 22 which functions to interpret the contents of the command transmitted from the central control device 19 through the data transmission line 21 and which also causes an operation command driving power supply unit 23 to produce the frequency signal corresponding to the contents of the command applied to the control circuit 22. The terminal unit $20_1$ also comprises a cable designation driving power supply unit 24 which functions to produce signals having driving frequencies $f_1$ and $f_2$, and a switching circuit 25 which performs the function of switching to feed a signal having the driving frequency $f_1$ or $f_2$ from the cable designation driving power supply unit 24 to any of the leader cables 12 through 15 under the control of the control circuit 22. The operation command driving power supply unit 23 produces, for example, the frequency signal under the control of the control circuit 22 in the manner described hereinbelow.

The driving power supply unit 23 produces at first a signal having a stop station designation frequency $f_3$, which is not limited to one frequency $f_3$ but is a plurality of frequencies $f_{31}, f_{32} \ldots f_{3n}$, for designating respective stations where the lift truck should stop. The terminal unit $20_1$ also comprises a mixer 26 which functions to mix the signal having the stop station designation frequency $f_3$ from the driving power supply unit 23 with the signals having driving frequencies $f_1$ and $f_2$ from the driving power supply unit 24. This frequency $f_3$ is indicated generally in FIG. 3, but each station has its own specific designation frequency from $f_{31}$ to $f_{3n}$, respectively. Thus, one of the frequencies $f_{31}-f_{3n}$ specific to the station at which the vehicle is to be stopped is applied as the frequency $f_3$. The mixer 26 thereby produces an output signal having the driving frequencies $f_1$ and $f_2$ mixed with the frequency $f_3$ and applies it to the switching circuit 25, which functions to supply its output to any of the leader cables 12 through 15 thereby energizing the station coil of the station designated.

The control circuit 26 also translates course designation data from the central control device 19 and applies it to the driving power supply unit 23. The driving power supply unit 23 also supplies signals having turning designation frequencies $f_{41}$ and $f_{42}$ for designating rightward or leftward turning of the fork lift truck $FL_1$ together with the frequency $f_3$ to the mixer 26, which mixes the frequencies $f_{41}$ and $f_{42}$ with the frequencies $f_1$, $f_2$ and $f_3$ thereby applying a signal having the mixed frequencies through the switching circuit 25 to any of the cables 12 through 15 before the lift truck starts the loading/unloading sequence (the steps as indicated by a broken line in FIG. 1) at the stop station.

It is to be noted that if the station coils are provided separately from the leader coils 12 through 15, the mixer 26 is unnecessary and the signals of frequency $f_{31}-f_{3n}$ may be directly applied to the station coils, as indicated by the chain line arrow 48 (FIG. 3). In this case, the signal of frequency $f_4$ is not used.

The control circuit 22 also interprets loading/unloading designation data from the central control device 19 and applies it to the driving power supply unit 23. The driving power supply unit 23 also applies lifting height designation frequencies $f_{51}$ through $f_{5n}$ for designating the height of lifted forks FK (loading and unloading forks) of the fork lift truck $FL_1$ in the loading/unloading sequence to a coil 27 disposed at a place where the loading/unloading sequence is conducted by the fork lift truck, for the operation command and position confirmation.

The control circuit 22 also translates loading/unloading designation data from the central control device 19 and applies it to the driving power supply unit 23. The driving power supply unit 23 also signal having loading/unloading designation frequencies $f_{61}$ and $f_{62}$ for designating the loading of the goods on the forks FK or the unloading of the goods from the forks FK in the loading/unloading sequence to the coil 27.

It is to be noted that the aforementioned various designation frequencies are different from each other as previously described and are also different from the driving frequencies $f_1$ and $f_2$.

The terminal unit $20_1$ also comprises an abnormal signal and the like receiver unit 28 which functions to receive the abnormal signal from the fork lift truck $FL_1$, suitable fork lift truck operation feedback information and the like and supply the information to a transmitter-receiver unit 29 in the terminal unit $20_1$, which unit 29 applies the information through a line 21 to the central control device 19.

In addition to the above description, in a case where additional various functions are to be accomplished such as confirmation of storage of the goods on the rack 10, prevention of double storage of the goods on the rack 10, etc., the terminal units $20_1$ through $20_n$ may suitably control the fork lift trucks to feed back necessary information to the central control device 19.

It will be understood from the foregoing description that control devices for the controlling operatorless travelling, control devices for controlling unmanned loading-unloading and safety devices, etc. are carried on the fork lift trucks $FL_1$ through $FL_n$, or operatorless loading/unloading vehicles. The block diagram of the essential constitution of the unmanned operatorless control system carried on the vehicle or fork lift truck is shown in FIG. 4.

Figure 4:
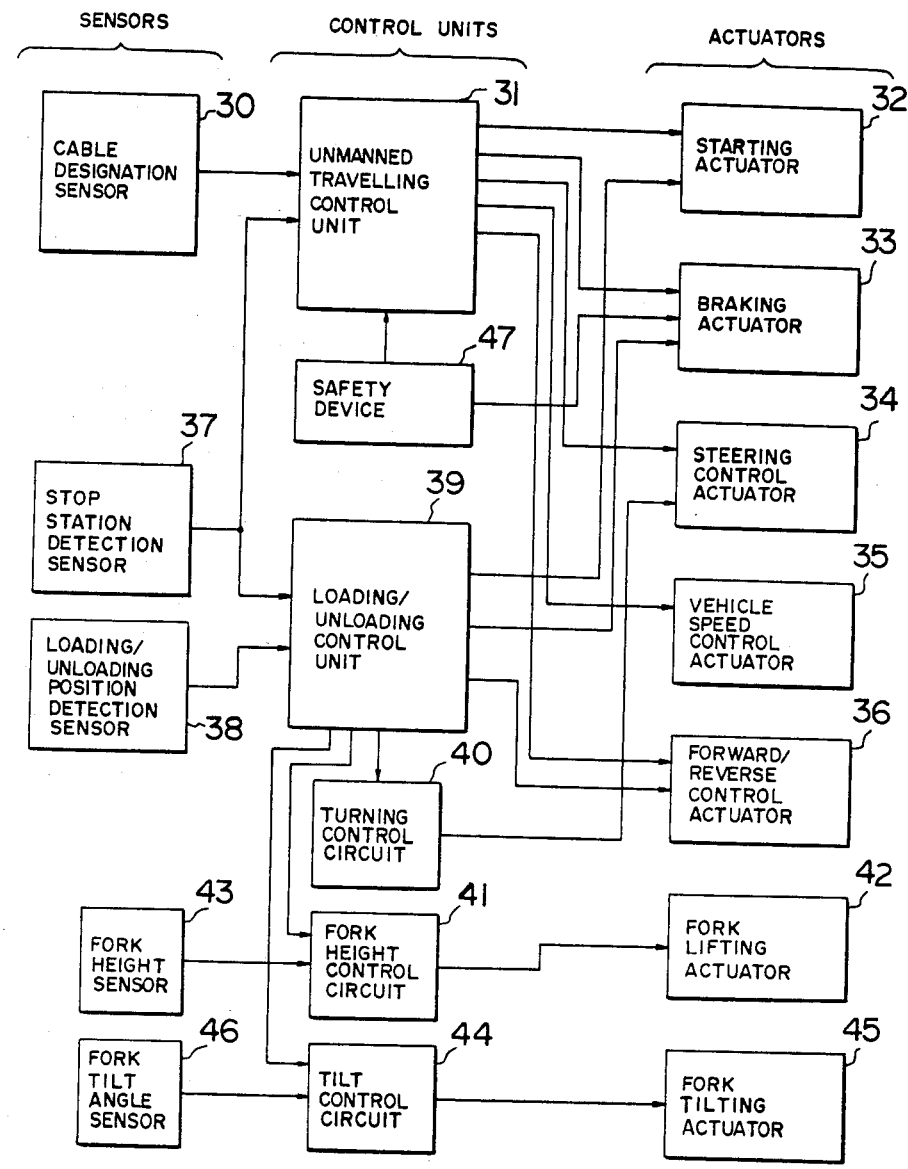
FIG. 4 is a block diagram of one example of the control units carried on the loading and unloading vehicle (fork lift truck) used in the above described embodiment of the invention.

In FIG. 4, the operatorless control system comprises a cable signal sensor 30 which may consist of four detector coils mounted at four corners of the fork lift truck for detecting the lateral displacement of the lift truck with respect to the leader cables (12 through 18) and the attitude angle of the lift truck, as known. The control system for the lift truck also comprises an operatorless travelling control uniti 31 which receives the output of the sensor 30 and detects the travelling control command from the leader cable thereby producing control signals as will be hereinafter described in greater detail. The sensor 30 also picks up various operation designation frequencies of signals fed from the respective terminal units $20_1$ through $20_n$ to the respective leader cables. The travelling control unit 31 applies its control signals to a starting actuator 32, a braking actuator 33, steering control actuator 34, a vehicle speed control actuator 35, and a forward/reverse control actuator 36, etc., for carrying out the unmanned operatorless travelling of the lift truck.

The control system for the lift truck also comprises a station detection sensor 37 for picking up the aforementioned stop station position from the leader cable thereby producing the stop station designation output signal. The control system also comprises a loading/unloading position detection sensor 38 which detects the position of the coil 27 for the operation command and position confirmation as described above, a loading/unloading work control unit 39 which receives the stop station designation signal from the sensor 37 and the coil position signal from the sensor 38 and thereby produces suitable driving signals. Thus, the control unit 39 performs the unmanned loading/unloading steps illustrated by broken lines in FIG. 1 in accordance with a predetermined sequence and sensor 37 picks up the stop station designation signal, which is applied to the control unit 39. The control unit 39 will detect the desired stop station and provide the stop station designation output signal to the braking acutator 33 for braking the lift truck at the designated station. The control system also comprises a turning control circuit 40 which receives the driving signal from the control unit 39 and produces the turning designation output, which is applied to the steering control actuator 34 for turning the lift truck leftwardly or rightwardly.

The lift truck is driven toward the rack 10 or the machine tool 11 as designated. When the lift truck reaches the station as designated by the position of the coil 27 detected by the sensor 38, it is stopped.

The sensor 38 also picks up the lifting height designation signal from the coil 27 and applies the signal through the control unit 39 to a fork height control circuit 41 which produces a suitable fork height output signal to a fork lifting actuator 42 for lifting the forks FK of the lift truck to the designated height. A fork height sensor 43 serves the function of detecting the height of the forks FK thus lifted and supplying a feedback signal representing the detected height of the forks FK to the height control circuit 41.

The control unit 39 applies a suitable signal to a tilt control circuit 44 which produces a suitable tilt angle of inclination/output signal of the forks FK of the lift truck to a fork tilting actuator 45 for tilting the forks FK of the lift truck to the designated angle. A fork tilt angle sensor 46 functions to detect the tilting angle of the forks FK thus tilted and supply a feedback signal of the tilt angle of the forks FK back to the tilt control circuit 44.

The detail of the loading/unloading work sequence of the lift truck according to the control unit 39 will hereinbelow be described in greater detail. In summary the sequence is achieved under the control of the height of the forks FK and of the minute forward or reverse travelling of the lift truck. The automatic driving and steering actuators may be an electric, hydraulic, pneumatic type.

The control system also comprises a safety unit 47 which is suitably constructed to effect an emergency stop of the lift truck in a case, for example, where the lift truck is displaced too far from the course of the leader cable, where the leader cable in broken, or where the truck contacts with any obstacle.

DESIGNATION OF COURSES

In a case where the automatic travelling course of the fork lift trucks provided with the leader cables comprises a number of branched courses or combined course, the designation of the travelling course of the lift truck at a branch point becomes an important factor. The control system of the present invention is applicable to any course designation system, but one example thereof will now be described in detail.

Figure 5:
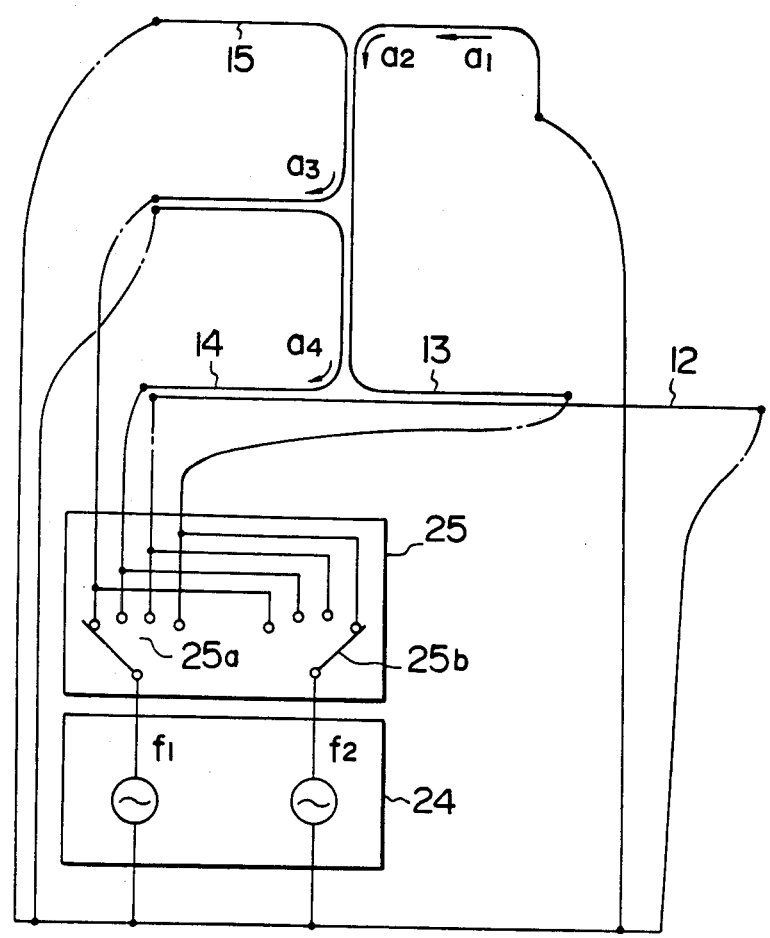
FIG. 5 is a view of one example of a system for designating the travelling course of the vehicle.

One of the driving power sources is connected to a desired leader cable by the switching circuit 25 (see FIG. 3) of the terminal units $20_1$ through $20_n$ of the respective blocks. In this case, the branched course can be designated by connecting the different driving power sources simultaneously to at least two leader cables forming a part of a course in combination with each other. One example will now be described with reference to FIG. 5 as regards the block $B_1$ shown in FIG. 1. In FIG. 5, the cable designation driving power supply unit 24 separately generates two different frequencies $f_1$ and $f_2$, which may be connected through two rotary switching contacts 25a and 25b, respectively to all the leader cables 12 through 15 of the corresponding block. The contacts 25a and 25b may also be constructed of relays or an equivalent electronic switching circuit under the switching control of the control circuit 22 (see FIG. 3). In case the vehicle is branched from a course along one cable to a course along another cable, both cables are supplied with driving power.

For example, in a case where the lift truck is desired to be run in the path indicated by arrows $a_1$, $a_2$ and $a_3$ in FIG. 5, the contacts 25a and 25b of the switching circuit 25 are respectively connected to the leader cables 15 and 13 as shown. In this way, the lift truck is at first led to the cable 13 through which the frequency $f_2$ flows and travels in the direction as illustrated by the arrow $a_1$. As the lift truck further advances along the arrow $a_2$ the cable 13 merges with the cable 15, and the lift truck is led toward the cable 15 through which the frequency $f_1$ flows. Thus, the lift truck is led to the cable 15 and is branched in the direction of the arrow $a_3$. In this case, a circuit for controlling the transfer of the frequency signal to be followed when the cable designation signal sensor 30 picks up a new frequency is provided within the unmanned operatorless travelling control device 31 (see FIG. 4) in the truck. In other words, the system is so constructed that when the lift truck reaches the course where two or more driven leader cables are combined, the truck may transfer automatically to a new leader cable thus combined. If the truck is desired to be run in the path indicated by arrows $a_1$, $a_2$. $a_4$, the driving frequencies $f_1$ and $f_2$ are connected to the leader cables 13 and 14 respectively. Thus, the leader cables to be connected with the driving power supply are switched or transferred by the switching circuit 25 in accordance with a desired course. The driving frequency is not limited to two frequencies $f_1$ and $f_2$ but a larger number of frequencies may be used.

It should also be noted that although the designation of the course has been effected by switching of the driving power supply applied to the leader cable from the switching circuit 25 in the above embodiment, the designation of the course may also be achieved by provision of frequencies transferred from one to another in changing of the courses such as at the branch points as will be hereinbelow described in greater detail.

Figure 14:
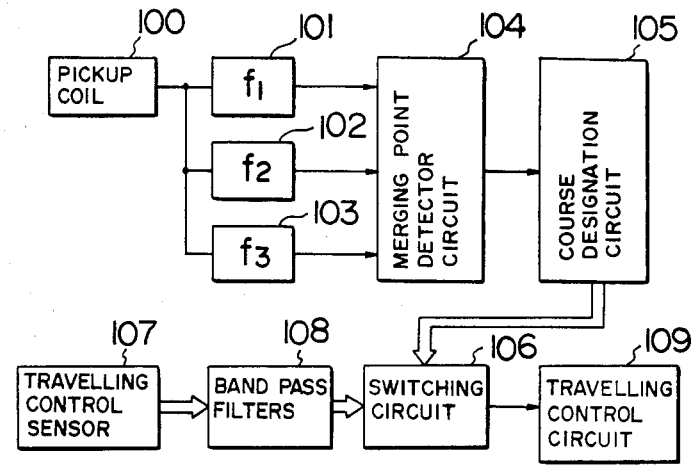
FIG. 14 is a block diagram of one example of the course designation device.

FIG. 14 is a block diagram showing one example of the course designation device.

The course designation device comprises a branching control pickup coil 100 which functions to pick up the frequency signals such as illustrated by $f_a$, $f_b$, $f_c$ from the leader cables and produces the frequency output signals. The frequency signals thus induced at the pickup coil 100 are applied to a plurality of band pass filters 101, 102 and 103 in the course designation device. These band pass filters 101, 102 and 103 perform functions of passing the respective frequencies $f_a$, $f_b$, and $f_c$, and thereby discriminating frequency or frequencies flowing at present through the cables provided along the course. For example, assume that the lift truck is running along the combined course of the leader cable through which the frequency $f_a$ flows and of the cable through which the frequency $f_b$ flows. The filters 101 and 102 will pass the frequencies $f_a$ and $f_b$, respectively. If the truck is running along the branched course of the cable through which the frequency $f_c$ flows, the filter 103 will pass only the frequency $f_c$ thereby producing its frequency output. When the truck runs along a course except the combined or branched course, no filters 101 to 103 will undergo an output variation.

When the truck then reaches a merging point or a branch point of the courses, certain outputs of the filters 101 to 103 will vary. More particularly, when the truck reaches the merging point of the courses, a leader cable different from the present cable from which the corresponding frequency is received by the course designation device is approached by the truck and accordingly, the course designation device, so that the level of the frequency signal received from the cable thus approached will rise in the output of the corresponding one of the filters 101 to 103.

The course designation device also comprises a merging point detector circuit 104 which receives the respective outputs of the band pass filters 101 through 103 for detecting the change in the output frequency signals from the filters 101 through 103 (i.e. from low to high level) thereby detecting the fact that the truck has reached the merging point.

The course designation device also comprises a course designation circuit 105 which performs the functions of designating the course to be branched next when it receives the merging point detection signal from the merging point detector 104 and which accordingly controls a switching circuit 106 to select the frequency of the cable provided along the course to be branched next.

The course designation device also comprises a travelling control sensor 107 mounted to the body of the lift truck such for example, on both sides of the front and rear portions of the truck in the form of four pickup coils for picking up the frequency signals from the cable along the course thereby producing the respective frequencies such as indicated by $f_a$, $f_b$, $f_c$. The frequency signals thus picked up at the sensor pickup coils constituting the sensor 107 are applied to a plurality of band pass filters of a band pass filter group 108 in the course designation device. These band pass filters function to pass the respective frequencies such as $f_a$, $f_b$, $f_c$ and to discriminate the frequencies flowing along the cables provided at the courses thereby supplying their frequency outputs to the switching circuit 106. The switching circuit 106 functions to deliver only one frequency designated by the course designation circuit 105 selectively to a travelling control circuit 109 in the course designation device.

The travelling control circuit 109 is adapted to follow up the frequency signal of the leader cable thus designated selectively thereby automatically controlling steering of the lift truck. Accordingly, the course designation device is so constructed that the truck will follow up the frequency of the course to be branched next while the truck is running along the combined course after it has reached the merging point of the courses. Thus, no particular control is made at the branch point of the course very and the lift truck smoothly enters the predetermined branched course under the control of the cable through which the frequency thus followed up by the present course designation device flows.

The course designation circuit 105 is adapted to have a program of the travelling course of the lift truck in advance and to proceed according to the program at every merging point thus detected. It is to be noted that the above described branching control pickup coils 100 may not necessarily be provided, but the aforementioned travelling control sensor 107 may be so constructed as to additionally function to pick up the frequency signals from the cables. It should also be noted that the aforesaid merging point detector 104 and the course designation circuit 105 may suitably be constructed of digital logical circuits.

Figure 15:
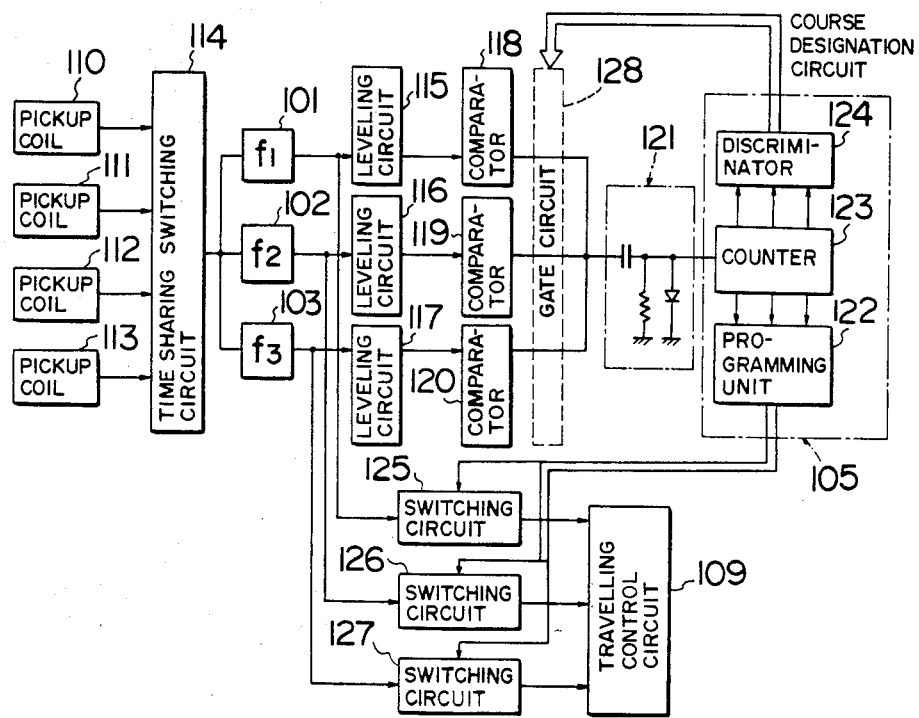
FIG. 15 is a detailed block diagram of one example of the course designation device in FIG. 14.

One example of the aforementioned course designation device will now be described with reference to FIG. 15.

In the example illustrated, the aforesaid branching control pickup coils 100 are not separately provided but the four travelling control sensors or pickup coils 110, 111, 112 and 113 mounted at both sides of the front and rear portions of the lift truck are used to perform the functions of the pickup coils 100. The frequency signals received by these four sensors 110 through 113 are selected in a time-division manner by a time-sharing switching circuit 114 and are then multiplexed in a time-division manner thereby. The output frequency signals thus selected and multiplexed from the switching circuit 114 are applied to a plurality of band pass filters 101 through 103 for the respective frequencies $f_a$, $f_b$, $f_c$. The frequency outputs of the respective filters 101 through 103 are applied to respective leveling or equalization circuits 115, 116 and 117, which are constructed of delay circuits for leveling or equalizing the levels of the received signals sequentially applied from the respective sensors 110 through 113 in a time-sharing manner thereby obtaining a mean received signal level. This is because distances from the four corners of the truck to the leader cable may sometimes be different from each other.

The course designation circuit also comprises a plurality of comparators 118, 119 and 120 which function to compare the received frequency signal levels of the respective frequencies $f_a$, $f_b$, $f_c$ with a reference voltage thereby judging or determining whether the truck is near the leader cable through which the corresponding frequency signal flows or not in such a manner that if the received frequency signal level is higher than the reference voltage, it produces high (positive) level output, while if the received frequency signal level is lower than the reference voltage, it produces low (0 or negative) level output. Consequently, when the lift truck approaches the merging point of the courses, the received frequency signal level of the corresponding combined course becomes high, so that the output of the corresponding comparator of the frequency of the combined course accordingly is inverted from low to high level. The output of the corresponding comparator is then applied to a variation detection pulse generator 121 in the course designation device.

The pulse generator 121 consists, for example of a capacitor, a resistor and a diode, as shown, for detecting only the variation in the outputs of the comparators 118 through 120 from a low level to a high one thereby producing one shot of pulse. Accordingly, the pulse generator 121 merely detects the merging point but does not detect the branch point of the course.

A branching sequence is programmed in advance in the course designation circuit 105, and such program is carried out step by step in accordance with the pulse signals supplied by the aforesaid pulse generator 121. More specifically, the course designation circuit 105 comprises a programming unit 122 which is adapted to have a suitable program memory such as a plurality of switching elements or read-only memory, random access memory, etc. for setting the frequencies ($f_a$, $f_b$, $f_c$) to be selected in each step. A counter 123 successively counts the pulses from the pulse generator 121. The programming unit 122 sequentially reads out the frequencies ($f_a$, $f_b$, $f_c$) set in the respective steps in response to the outputs from the counter 123. Thus, the frequency designation or command which the truck should follow up is sequentially delivered from the programming unit 122 in response to the outputs of the counter 123.

The course designation device also comprises a plurality of switching circuits 125 to 127 provided corresponding to the band pass filters 101 to 103 for the respective frequencies $f_a$, $f_b$, $f_c$, which circuits 125 to 127 receive the outputs from the band pass filters 101 to 103 and selectively produce only a single frequency output designated by the programming unit 122. Thus, the output frequency from the switching circuits 125 to 127 is applied to a travelling control circuit 109 in the course designation device. The truck according automatically travels along the course by following up a single leader cable through which this frequency signal flows.

It is to be noted that in a case where it is not necessary to always produce a next branching comand or designation every time when the truck reaches a merging point of the courses, a suitable discriminator 124 may be provided in the course designation circuit 105. For example, a program the contents of which are the same as those of the programming unit 122 is set in the discriminator 124 in such a manner that contents proceeding by one step from the contents of the programming unit 122 can be read therefrom. Therefore, in this case, a suitable gate circuit 128 is provided at the output side of the aforesaid comparators 118 to 120 for operating the pulse generator 121 only when there has occurred a comparator output of the frequency coinciding with the output of the discriminator 124 (i.e., the desingated frequency of the next step). Thus, one pulse is produced only when the truck reaches a necessary merging point so as to proceed the program by one step.

It will be understood from the foregoing description that when the truck has reached a merging point of the course, the frequency of the course to be branched next can already be designated or commanded, so that the truck may proceed to travel a desired branching course at the branch point of the course merely by following up the frequency designated in the combined course.

CONSTRUCTION OF STATION

When the fork lift truck $FL_1$ through $FL_n$ travelling along the courses as aforementioned reach the stations $S_1$, $S_2$, $S_3$, . . . provided along the courses, the trucks stop at the stations as required. The stations at which the trucks must stop are designated by the central control device 19 through the terminal units $20_1$ through $20_n$. Therefore, it is necessary to separately specify the stations within the respective blocks $B_1$ through $B_n$. A relatively simple construction of the stations may be achieved in such a manner that exciting or energizing coils are separately provided at the positions of the respective stations independently from the leader cables and are connected to the operation command driving power supply unit 23 (see FIG. 3) of the terminal units. Thus, this arrangement may supply the stop station designation frequency $f_3$ directly to the station coils as illustrated by two-dotted broken line 48 in FIG. 3.

Such exciting station coils may be constructed by forming in coil shape the portion of the leader cable corresponding to the position of the station. Accordingly, the frequency signal for energizing the station coils is transmitted additionally through the leader cables by superposing it upon the control frequencies of the leader cables.

Figure 6:
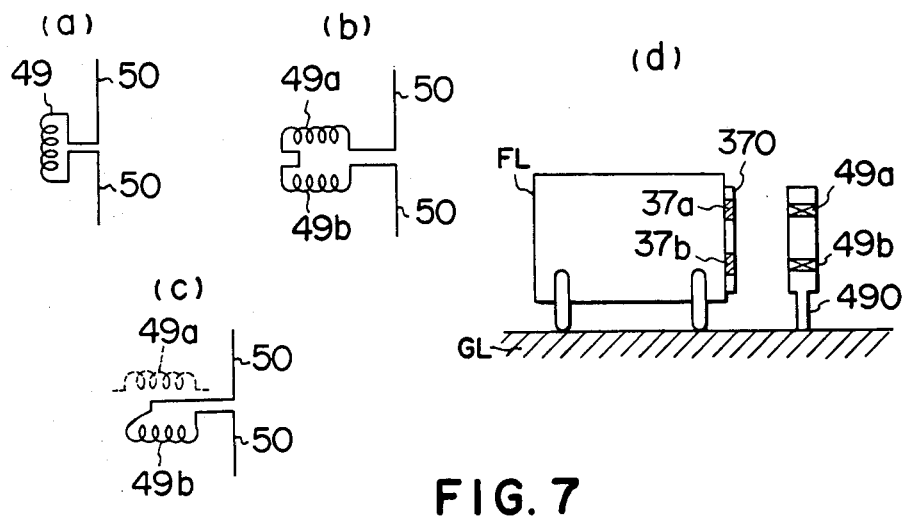
FIGS. 6(a) to 6(c) are partial circuit arrangements for explaining the construction of the winding aspects of the coil at the station.

As shown in FIG. 6(a) in a case where one coil 49 is formed by leader cable 50 at the position of the station, two modes may be obtained according to the winding direction of the coil 49 or three modes may be provided if a non-energizing state of the coil 49 is included. The states obtainable from one coil are as follows:

0: non-energizing

+: positive phase energizing such as clockwise winding

−: negative-phase energizing such as counterclockwise winding

Thus, the combination consisting of three states is available. Assume that one coil corresponds to one bit in a digital form. If two coils are employed, the respective stations may be specified with two bit data. More specifically, as one bit proceeds ternary, two bits result in a combination of $3^2=9$ ways.

Two coils 49a and 49b are provided in one station as illustrated in FIGS. 6(b) and 6(c). FIG. 6(b) shows an example in which the coils 49a and 49b are connected in series with each other. FIG. 6(c) indicates another example in which the coil 49b is connected to the cable 50 while the other coil 49a is not connected to the cable 50 as shown. In a case where the two coils 49a and 49b are used in one station, the modes of connection of the coils 49a and 49b are as listed in the following

TABLE 1

| Coils | Stations | | | | | | | | |
|---|---|---|---|---|---|---|---|---|---|
| | 1 | 2 | 3 | 4 | 5 | 6 | 7 | 8 | 9 |
| 49a | 0 | 0 | 0 | + | − | + | + | − | − |
| 49b | 0 | + | − | 0 | 0 | + | − | + | − |

0: Non-energizing or non-connection
+: positive-phase
−: negative-phase

As listed in the above Table 1, there are combinations of $3^2=9$ possible. Since "0 0" in the first column cannot however, specify the position of the station, this combination cannot be used for the notation of the station. Accordingly, eight ways of combination from 2nd to 9th in the Table 1 can be utilized for identification of the stations. Eight stations can be constructed with one station having two coils 49a and 49b, which are connected in the aforementioned different ways with different phases from 2nd to 9th columns in the Table 1.

In addition, if a plurality of frequencies are to be adopted as the stop station designation frequency generally designated by $f_3$ flowing through the station coils 49a and 49b, eight stations can be provided for each frequency. If three frequencies $f_{31}$, $f_{32}$ and $f_{33}$ are used for the stop station designation frequencies, eight stations can be provided for each frequency. As a result, a total of 24 stations are available.

It is assumed that two frequencies are employed in the respective coils 49a and 49b of one station. The contents of one bit (i.e. different states of one coil) is as follows:
 0: non-energizing
 $+(f_{31})$: positive-phase energizing of frequency $f_{31}$
 $+(f_{32})$: positive-phase energizing of frequency $f_{32}$
 $-(f_{31})$: negative-phase energizing of frequency $f_{31}$
 $-(f_{32})$: negative-phase energizing of frequency $f_{32}$
Thus, five ways or quinary notation can be provided therefor. In this way, if two bits (using two coils 49a and 49b) are adopted, there can possibly be combination of $5^2 = 25$ ways. As previously described, since "0 0" of the combination cannot specify any station 24 different stations can be specified thereby.

If three frequencies $f_{31}$, $f_{32}$ and $f_{33}$ are adopted, the combinations of two frequencies are as follows:
 $f_{31}$ and $f_{32}$
 $f_{31}$ and $f_{33}$
 $f_{32}$ and $f_{33}$
Thus, in this case, the possible number of stations can be $24 \times 3 = 72$ ways. Thus, 72 stations can be specified.

If three frequencies can be adopted in one station coils 49a and 49b, the contents of one bit (the number of states of one coil) are as follows:
 0: non-energizing
 $-(f_{31})$: positive-phase energizing of frequency $f_{31}$
 $-(f_{32})$: positive-phase energizing of frequency $f_{32}$
 $-(f_{33})$: positive-phase energizing of frequency $f_{33}$
 $-(f_{31})$: negative-phase energizing of frequency $f_{31}$
 $-(f_{32})$: negative-phase energizing of frequency $f_{32}$
 $-(f_{33})$: negative-phase energizing of frequency $f_{33}$
Thus, 7 ways can be provided for one bit. Accordingly, $7^2 - 1 = 48$ different stations can be specified with two bits (two coils 49a and 49b).

In summary, in a case where one station employs two coils 49a and 49b with three frequencies $f_{31}$, $f_{32}$ and $f_{33}$ as the stop station designation frequencies $f_3$ in such a manner that $8 \times 3 = 24$ stations are specified one frequency with the result that $24 \times 8 = 72$ stations are specified for two frequencies and 48 stations are specified with three frequencies, $24 + 72 + 48 = 144$ stations can totally be specified from above. This means that a large number of stations can be specified with a relatively small number of frequencies (e.g. 3 frequencies).

It will be apparent from the foregoing description that since the respective stations can be separately specified by the different energizing modes of the coils, two pickup coils 37a and 37b are mounted to the positions of the truck corresponding to the positions of the station coils 49a and 49b of the stations as the station detection sensor 37 (see FIG. 4). For example, as illustrated in FIG. 6(d), a fixture 49θ vertically erected on the ground has the station coils 49a and 49b attached thereto, and the pickup coils 37a and 37b are mounted through fitting 370 to the side of the fork lift truck FL opposite to the coils 49a, 49b.

The station detection sensor 37 will detect the energizing state and driving frequencies of the station coils 49a and 49b of the station for interpreting which station it is. Then, it stops the truck at the station in response to the designated contents from the central control device 19 through the terminal units $20_1$ through $20_n$, if the truck should stop there at.

LOADING/UNLOADING WORK SEQUENCE

When the fork lift truck automatically travelling along the designated course under the control of the leader cable provided along the course in an unmanned manner without an operator has stopped at the designated station, the operatorless unmanned travelling of the truck is stopped and the truck will then start the loading/unloading work in accordance with a predetermined loading/unloading work sequence.

Figure 7:
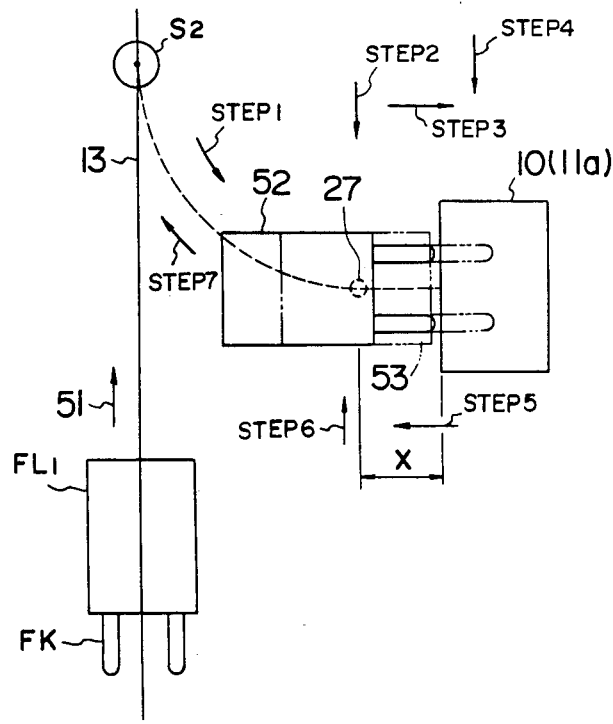
FIG. 7 is a schematic plan view for the explanation of the loading and unloading sequence of the fork lift truck.

In FIG. 7, when the fork lift truck $FL_1$ automatically travelling in reverse direction as illustrated by an arrow 51 along the leader cable 13 in an unmanned manner stops at the station $S_2$ and the truck is released from the automatic travelling control by the unmanned travelling control unit 31 (see FIG. 4), the loading/unloading work control unit 39 (see FIG. 4) is insteads operated to perform the unmanned operatorless loading/unloading work in accordance with the sequence as will be hereinbelow described.

The operation command and set position confirmation coil 27 is located on the ground side at a position spaced apart by a distance x which is longer than the length of the claws or ends of the forks FK of the truck from the rack 10 (or the loading/unloading exit 11a of the machine tool 11) on the way of the loading/unloading work sequence route as indicated by a broken line drawn from the station $S_2$ to the rack 10.

As depicted in a schematic plan view of the fork lift truck $FL_1$ in FIG. 8, a first position detection sensor 38a is mounted at a position of the lift truck $FL_1$ spaced apart by a distance equal to or slightly shorter than the distance x from the foremost end of the forks FK of the truck $FL_1$, and a second position detection sensor 38b is mounted at a position to the rear of the first sensor 38b on the truck $FL_1$ spaced apart by a distance x' substantially equivalent to the length of the forks FK. These sensors 38a and 38b correspond to the loading/unloading work position detection sensor 38 in FIG. 4. Alternatively, only one pickup coil may be mounted on the lift truck $FL_1$ while two coils may be mounted at an interval x' on the ground side.

The unmanned operatorless loading/unloading work sequence consists of the following eight steps:

In step 1, the lift truck $FL_1$ which has stopped at the station $S_2$ is caused to travel forwardly while turning by 90° rightwardly or leftwardly depending upon the direction of the position of the rack 10 (forward travelling with the forks FK directing forwardly) to the position as denoted by a solid line 52 in FIG. 7. Then, when the lift truck FL is moved to a position where the first sensor 38a of the truck $FL_1$ is in register with the position confirmation coil 27, the sequence proceeds to step 2.

In step 2, the turning and travelling of the truck $FL_1$ are stopped, and the forks FK of the lift truck $FL_1$ are lifted to a fork engaging height $H_2$.

The fork engaging height $H_2$ of the lift truck $FL_1$ at a time when the goods are unloaded from the forks FK onto the rack 10 (for storage of the goods in the warehouse) is different from that at a time when the goods are loaded from the rack 10 onto the forks Fk. As indicated in FIG. 9(a): in the event that the goods 55 on a pallet 54 into which the claws of the forks FK are inserted are unloaded to a certain shelf 10a of the rack 10 together with the pallet 54, the fork engaging height $H_2$ must be a sum of a height LH of the shelf 10a and an interval h between the pallet 54 and the shelf 10a. As shown in FIG. 9(b), in case the goods 55 on the shelf 10a are loaded onto the forks FK of the truck $FL_1$, the fork engaging height $H_2$ must be substantially identical to the height LH of the shelf 10a of the rack 10 (exactly the height of the openings of the pallet 54 into which the forks FK of the truck $FL_1$ are to be inserted).

In step 3, the lift truck $FL_1$ is caused to travel forwardly while maintaining the height of the forks FK at the fork engaging height $H_2$, to the position as illustrated by a one-dotted broken line 53 in FIG. 7. The fact that the truck $FL_1$ has reached the position designated by the one-dotted broken line 53 in FIG. 7 can be confirmed by allignment of the second sensor 38b of the truck $FL_1$ with the position confirmation coil 27 on the ground. At this time the forks FK of the truck $FL_1$ are disposed on the shelf 10a of the rack 10 or into the fork engaging exit 11a of the pallet 54. More specifically, when the truck $FL_1$ unloads the good (see FIG. 9(a)), the goods 55 are placed on the shelf 10a, while when the truck $FL_1$ loads the goods (see FIG. 9(b)), the forks FK of the truck $FL_1$ are inserted into the exit 10a of the pallet 54 on the shelf 10a.

In step 4, the forks FK of the truck $FL_1$ are lifted to the fork disengaging height $H_3$ (or is lowered to the height $H_2$) while the lift truck $FL_1$ is stopped at the position as indicated by the one-dotted broken line 53.

The fork disengaging height $H_3$ of the truck FL at a time when the goods are unloaded from the forks FK is different from that at a time when the goods are loaded onto the forks FK. Since the fork engaging height $H_2$ was "LH+h" when the goods are unloaded from the forks FK (as described above, the fork disengaging height $H_3$ may be provided substantially at the height LH of the shelf 10a and the goods 55 may also be placed on the shelf 10a together with the pallet 54. Since the fork engaging height $H_2$ was "LH" when the goods are loaded onto the forks FK as previously described, the fork disengaging height $H_3$ may be provided at the height "LH+h" (see FIG. 9), and the goods 55 may also be lifted together with the pallet 54.

In step 5, the fork lift truck $FL_1$ is caused to travel in reverse direction so that the truck $FL_1$ returns to the position as indicated by a solid line 52 from the position as illustrated by the one-dotted line 53 in FIG. 7. At the time when the goods 55 are unloaded from the forks FK, the forks FK are pulled out of the pallet 54 placed on the shelf 10a, so that the goods 55 are stored on the shelf 10a of the rack 10. When the goods 55 are loaded onto the forks FK, the goods 55 loaded onto the forks FK through the pallet 54 are carried out of the shelf 10a of the rack 10. When the first sensor 38a of the truck FL detects the position of the position confirmation coil 27 on the ground, this step 5 is finished, and the sequence will be forwarded to a next step 6.

In step 6, the forks FK are lowered to the normal height $H_1$ while the truck $FL_1$ is stopped at the position as indicated by the solid line 52 in FIG. 7.

In step 7, while the forks FK are maintained at the normal height $H_1$, the truck $FL_1$ is steered in the same direction as that of the step 1 to turn by 90° while travelling in reverse direction and is thus returned to the position of the station $S_2$. When the truck $FL_1$ is returned to the position of the station $S_2$, the sequence will proceed to step 8.

In step 8, completion of the loading/unloading work sequence is confirmed and the operation of the unmanned operatorless travelling control unit 31 is resumed.

Thus, the loading/unloading work can be automatically accomplished, and when the completion of the loading/unloading work is confirmed at the step 8, the lift truck $FL_1$ will thereafter start automatically again along the leader cable 13 of the course.

Figure 10:
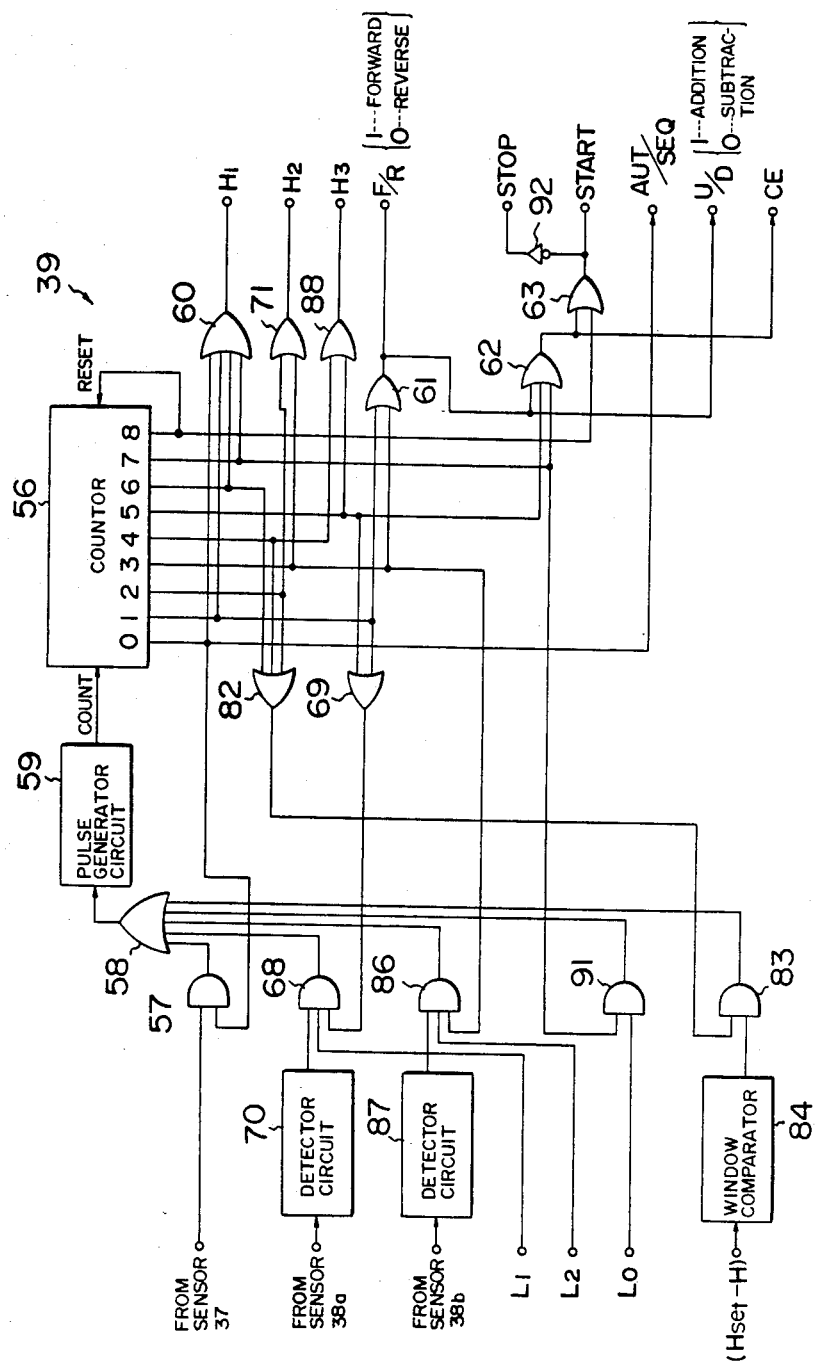
FIG. 10 is a block circuit diagram of one example of the control unit for the loading and unloading operation shown in FIG. 4.

The example of the loading/unloading work control unit 39 for controlling the aforementioned loading/unloading work sequence is shown in FIG. 10.

In FIG. 10, a counter 56 is constructed to designate the step to be carried out and is reset to "O" when the truck FL is automatically travelling under the control of the leader cable along the course. Accordingly, the output of the step 0 of the counter 56 becomes a signal "1" (high level). The output from the counter 56 for designating the step 0 is applied to one input of an AND circuit 57. The signal from the station detection sensor 37 is applied to the other input of the AND circuit 57. The signal from the sensor 37 becomes "1" when the lift truck FL reaches the station at which the lift truck FL should stop. Thus, the output "1" of the AND circuit 57 is applied through an OR circuit 58 to a pulse generator circuit 59. Therefore, the pulse generator 59 applies one pulse to the input of the counter 56. When the counter 56 receives one pulse from the pulse generator 59, the counted value of the counter 56 becomes "1" thereby producing an output "1" for designating the step 1.

The signal "1" for designating the step 1 from the counter 56 if applied to one input of an OR citcuit 60, which produces its output "1" thereby designating the height of the forks FK of the truck FL at the normal height $H_1$. The signal "1" for designating the step 1 is also applied to one input of an OR circuit 61, which produces its output "1" thereby designating the contents of the forward/reverse designation signal F/R to forward travelling, which signal F/R is applied to the forward/reverse control actuator 36 (see FIG. 4). The output "1" of the OR circuit 61 is also applied to one input of an OR circuit 62, which produces an output "1", which in turn is applied to one input of an OR circuit 63, which produces an output "1", which becomes a travelling designation signal START, which is applied to the starting actuator 32 (see FIG. 4) thereby driving the truck FL to travel. The output "1" of the OR circuit 62 becomes a counting allowance signal CE, which permits an up/down counter 64 of a turning control circuit 40 (see FIG. 11) to produced with counting. The output "1" of the OR circuit 61 becomes an up/down signal U/D, which is applied to the up/down counter 64 thereby causing the up/down counter 64 to perform addition.

Figure 11:
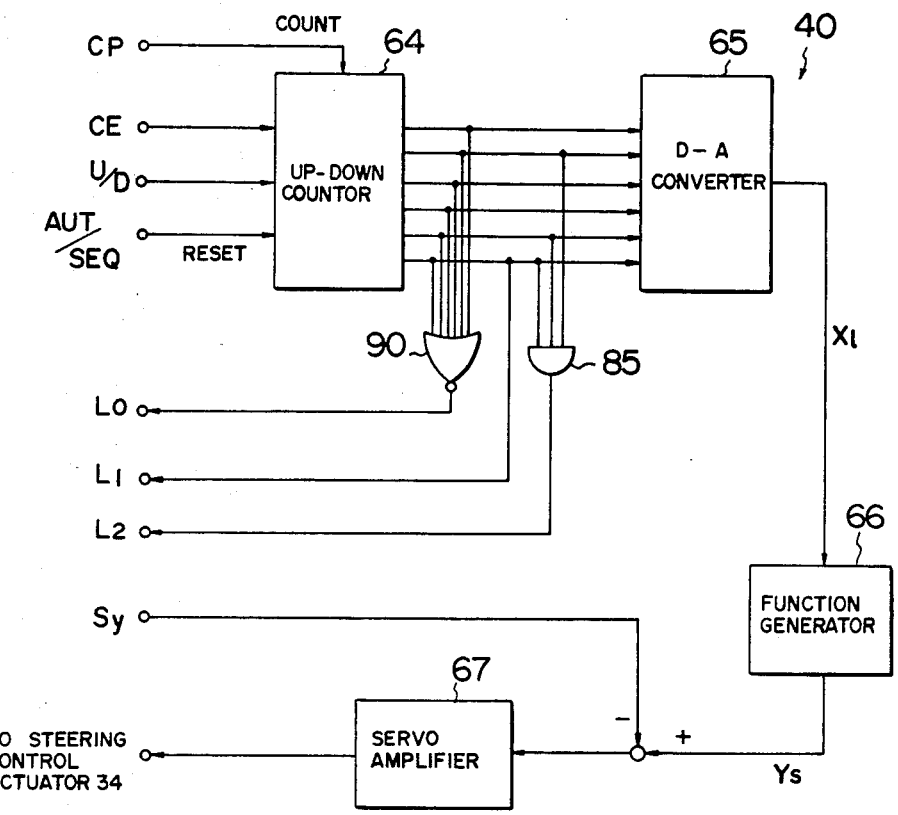
FIG. 11 is a block circuit diagram of one example of the steering control circuit of the arrangement shown in FIG. 4.

FIG. 11 shows one example of the turning control circuit 40. In the step 1, the up/down counter 64 starts to make a cumulative addition from 0. The up/down counter 64 receives counting pulses CP proportional to the travelling distance obtained from a vehicle speed detection sensor (which will hereinbelow be described in greater detail) of the truck FL. Accordingly, the counter 64 counts the travelling distance of the truck FL. The counted outputs of the counter 64 are applied to a digital-analog converter 65, which produces an analog output signal proportional to the travelling distance Xl of the truck FL. A steering drive angle Ys formed in turning of the truck FL is given as a function of the travelling distance Xl of the truck FL.

Figure 12:
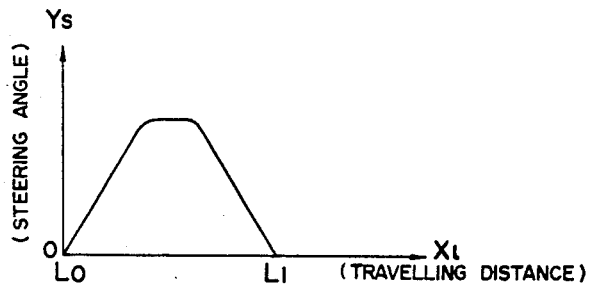
FIG. 12 is a graph indicating one example of the function of the steering angle control when the fork lift truck is turning or steering.

This function is, for example, as shown by a graph in FIG. 12. The output Xl of the digital-analog converter 65 is applied to the function generator 66, which produces an analog signal output for designating a proper steering drive angle Ys in response to the value of the travelling distance Xl. A steering angle detection signal Sy from the steering angle detector (not shown) provided in association with the steering operation mechanism of the truck FL is to be fed back. A servo amplifier 67 is driven in response to the deviation of the steering angle feedback amount Sy from the designated steering angle Ys. The output of the servo amplifier 67 is applied to the steering control actuator 34 (see FIG. 4) thereby controlling the steering drive. Thus, the truck FL is turned by 90° in accordance with the predetermined function.

When the travelling distance from the start of turning becomes $L_1$, the steering angle Ys returns to 0 thereby completing the turning drive of the truck FL. The counter 64 is constructed to detect the fact that the counted value of the counter 64 has become a value corresponding to the distance $L_1$ and thereupon produce an output signal $L_1$, which is applied to one input of an AND circuit 68 in FIG. 10. In FIG. 11, the counter 64 is constructed in such a manner that when the counter value thereof is 32, it corresponds to the distance $L_1$ so that the data of sixth bit corresponding to the count of 32 is delivered out as the signal $L_1$.

The output "1" of the step 1 from the counter 56 is also applied through an OR circuit 69 to another input of the AND circuit 68 in FIG. 10. Further, the output of the first position detection sensor 38a mounted on the truck FL is applied to a detector circuit 70 for detecting the fact that the sensor 38a has reached the position of the position confirmation coil 27 on the ground, which circuit 70 thus applied an output to the other input of the AND circuit 68 when the sensor 38a reaches the position of the position confirmation coil 27 and accordingly the truck FL reaches the set position for loading or unloading the goods. Accordingly, in the step 1 of the loading/unloading work sequence of the truck FL, the truck FL completes its turning when it has run the distance $L_1$, and when the truck FL has reached the predetermined position as illustrated by the solid line 52 in FIG. 7 where the position of the first sensor 38a coincides with the position of the position confirmation coil 27 on the ground, the AND circuit 68 will produce its output "1", which is applied through the OR circuit 57 and the pulse generator 59 to the counter 56 as one pulse so as to advance the counter 56 to the step 2. It is to be noted that the first sensor 38a may not be employed for advancing the counter 56 to the step 2 but only the signal $L_1$ from the up/down counter 64 (see FIG. 11) may be employed therefor.

Figure 13:
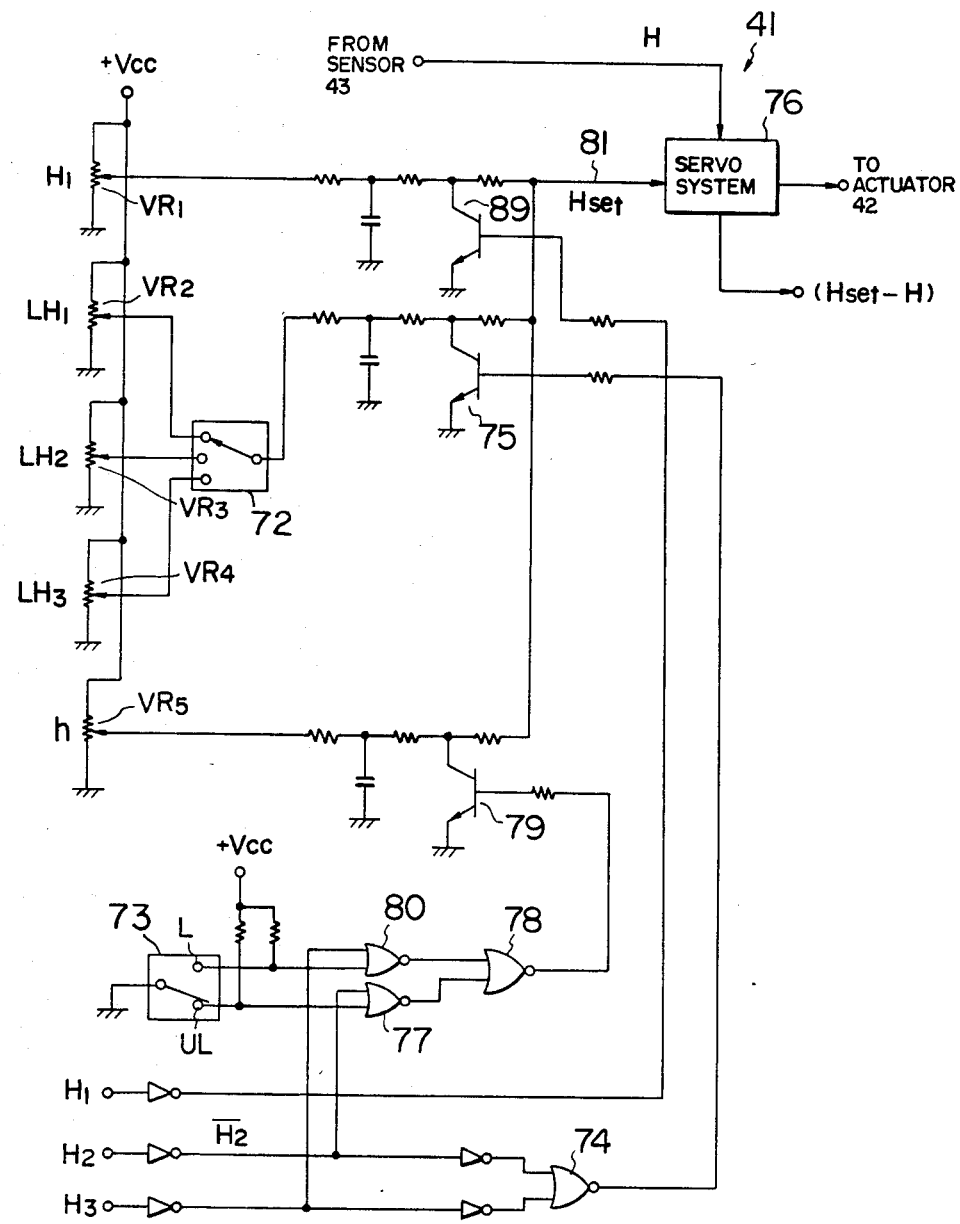
FIG. 13 is a schematic circuit diagram of one example of the fork height control circuit used in the arrangement illustrated in FIG. 4.

The output "1" from the counter 56 thus produced for designating the step 2 is applied to one input of an OR circuit 71, which produces an output "1" thereby producing the signal for designating the fork engaging height $H_2$. The signals $H_1$, $H_2$ and $H_3$ for designating the heights of the forks FX of the truck FL are applied to a fork height control circuit 41 in FIG. 13.

In the fork height control circuit 41, the normal height $H_1$ is set by a variable resistor $VR_1$. For example, if the rack 10 has three stages of shelves, the heights of the respective stages of the shelves are denoted by $LH_1$, $LH_2$ and $LH_3$, respectively and are set with the respective variable resistors $VR_2$, $VR_3$ and $VR_4$, respectively, and the interval h between the pallet and the shelf (see FIG. 9) is set by a variable resistor $VR_5$. The variable resistors $VR_2$ through $VR_4$ setting the heights $LH_1$ through $LH_3$ are connected at the sliding terminals thereof to a switching means 72. This switching means 72 are constructed to detect the height designating frequencies supplied from the terminal units $20_1$ through $20_n$ at the operation designation or command and position confirmation coil 27 at the truck side and to be switched to any one of the variable resistors $VR_2$ through $VR_4$ in response to the designated contents of the height designation frequencies by means of a suitable device such as relay. Since the frequency for designating whether the goods should be unloaded from the forks FK or should be loaded onto the forks FK is supplied to the position confirmation coil 27, and this frequency is detected at the truck side. Switching means 73 are switched in accordance with the designated contents of the frequency such as by means of a relay or the like. The switching means 73 are connected to the terminal L when the truck loads the goods on the forks FK and to the terminal UL when the truck unloads the goods from the forks FK. The switching means 72 and 73 are illustrated in the figure simply as indicating their mechanical switching function for convenience's sake. Alternatively, the switching means 72, 73 may be directly controlled by means of a wireless signal transmitted from the central control device 19.

In the step 2, as the signal $H_2$ for designating the fork engaging height $H_2$ becomes "1" this signal is applied to one input of a NOR circuit 74 through an inverter, the circuit 74 thereupon produce an output "0", which is applied to the base of a transistor 75, which accordingly becomes OFF. Accordingly, the height signal (voltage) selected by the switching means 72 (any one of the heights $LH_1$ through $LH_3$) is applied to a servo system 76. At this time, when the goods are unloaded from the forks FK (see FIG. 9(a)), the voltage of the terminal UL is "0", and the height signal $H_2$ is also "0", with the result that the output of the NOR circuit 77 becomes "1", while the output of a NOR circuit 78 becomes "0". As a result, a transistor 79 becomes OFF. Therefore, the signal of the interval h is added to the height LH of the shelf (any one of the heights $LH_1$ through $LH_3$), so that the signal output "LH+h" is applied to the servo system 76 as the designated height signal Hset.

When the goods are loaded onto the forks FK, the switching means 73 is connected at the terminal L. Accordingly, outputs of both NOR circuits 77 and 80 become "0", which are applied to the inputs of the NOR circuit 78, which thereupon produces an output "1", which in turn is applied to the base of the transistor 79. Therefore, the transistor 79 becomes ON. Thus, the interval h is not applied to the servo system 76, but only the designated height LH of the shelf is applied to the servo system 76. Thus, the servo system 76 drives the fork lifting control actuator 42 (see FIG. 4) on the basis of difference between the designated height value Hset applied through an input line 81 and the feedback amount H of the fork height applied from the fork height sensor 43 (see FIG. 4), thereby producing an actual difference value (Hset−H) of the actual height H from the designated height value Hset, which difference value is applied to the circuit shown in FIG. 10.

The signal for designating the step 2 produced by the counter 56 is applied through OR circuit 82 to one input of an AND circuit 83 thereby enabling the AND circuit 83. The difference value (Hset−H) from the servo system 76 is applied to window comparator 84, which is constructed to produce an output "1" when the difference value (Hset−H) is within a preset allowable error range. The comparator thereupon supplies it output "1" to the other input of the AND circuit 83. Thus, the AND circuit 83 will produce an output "1". That is, if the height of the forks FH becomes the fork engaging height $H_2$ represented by the designated heigt value Hset, the AND circuit 83 will produce an output "1" thereby driving the counter 56 through the OR circuit 58 and the pulse generator 59 to render the counter 56 to advance its count to the step 3.

The signal output for designating the setp 3 produced by the counter 56 is delivered through the OR circuit 71 thereby producing the signal $H_2$ for designating the fork engaging height $H_2$, which is retained at the aforesaid circuit 42 at the height of the fork engaging height $H_2$. Then, the signal for designating the step 3 produced by the counter 56 is also delivered through the OH circuit 61 thereby producing the signal F/R which is "1" as the forward travelling designation. The output "1" of the OR circuit 61 is also delivered through the OR circuits 62 and 63 thereby producing the signal START which is "1" to render the truck FL to travel forwardly. Simultaneously, the output "1" of the OR circuit 61 is also applied as the signal U/D to the up-down counter 64 of the turning control circuit 40 to permit the counter 64 to count the traveling distance of the truck FL. The output "1" of the OR circuit 62 is also applied as the signal CE to the up-down counter 64 of the turning control circuit 40 to function the same as above. Since the output Xl of the digital-analog converter 65 has already exceeded the distance $L_1$, no output is produced from the function generator 66, so that the truck merely travels forwardly.

When the truck FL reaches the position as indicated by the one-dotted broken line 53 in FIG. 7, the counted value of the up-down counter 64 becomes the value corresponding to the distance $L_2$, with the result that it detects the value. In the embodiment shown in FIG. 11, arrangements are made such that the value corresponding to the distance $L_2$ is 50. An AND circuit 85 will detect the fact that the value corresponding to the distance $L_2$ has become 50 thereby producing a signal $L_2$ of the distance $L_2$. This signal $L_2$ is applied to another input of the AND circuit 86 in FIG. 10. The signal for designating the step 3 from the counter 56 is applied to the one input of the AND circuit 86. In addition, the output of the second sensor 38b of the truck FL is applied to a detecting circuit 87 to cause the detecting circuit 87 to detect the fact that the sensor 38b has coincided with the position of the position confirmation coil 27 (at the position as indicated by the one-dotted broken line 53) thereby supplying its output "1" to the other input of the AND circuit 86. Therefore, when the predetermined position (where the counted distnce of the counter 64 in $L_2$) has coincided with the actual position (the output of the sensor 38b), the AND circuit 86 will produce its output "1" thereby driving the counter 56 through the OR circuit 58 and the pulse generator 59 to advance the count to the step 4.

The signal for designating the step 4 is applied to an OR circuit 88 thereby causing the fork disengaging height signal $H_3$ to become "1". When this signal $H_3$ becomes "1", which is applied to the NCR circuit 74 in FIG. 13, the NOR circuit 74 produces an output "0". Accordingly, the transistor 75 is OFF, but the transistor 79 will operate inversely to the case of the fork engaging height $H_2$. More particularly, when the goods are unloaded from the forks FK of the truck FL, the terminal UL of the switching 73 is "0" and the terminal L thereof is "1", with the result that the NOR circuits 80 and 77 produce outputs "0" while the NOR circuit 78 produces output "1" from the heights $H_3$ being "0" and the height $H_2$ being "1". Thus, the transistor 79 becomes ON. Consequently, the designated height Hset becomes only the height of the designated shelf LH so that the height "LH+h" of the fork engaging height $H_2$ is lowered by the height "h". When the goods are loaded onto the forks FK of the truck FL, since the terminal UL of the switch 73 is "1" and the terminal L thereof is "0", the transistor 79 becomes OFF, and the designated height Hset becomes a value which is a sum of the interval h and the designated height LH of the shelf, so that the forks FK is lifted by the height "h" from the height "LH" of the fork engaging height $H_2$. When the difference (Hset−H) becomes a value within the allowable error, the output of the AND circuit 83 becoes "1" as previously described thereby advancing the counter 56 to the step 5.

The signal for designating the step 5 is applied through the OR circuits 62 and 63 thereby causing the signal START to become "1" to render the truck to travel. However, since the output of the OR circuit 61 is "0", the signal F/R becomes "0" thereby designating the reverse travelling. Accordingly the truck already unloaded or loaded travels in reverse direction to the position of the solid line 52 in FIG. 7. At this time, the signal U/D is "0" thereby designating the subtraction in the up-down counter 64. Accordingly, when the truck travels in reverse direction by the same distance as it advanced in the step 3, the counted value of the counter 64 becomes the value corresponding to the distance $L_1$. Since the first sensor 38a of the truck coincides with the position of the position confirmation coil 27 on the ground, the output of the AND circuit 68 becomes "1" thereby driving the counter 56 to the step 6.

The signal for designating the step 6 is applied to the other input of the OR circuit 60 thereby causing the signal $H_1$ for designating the normal height $H_1$ to become "1". The signal $H_1$ thus produced is applied through an inverter to the base of a transistor 89 thereby bringing the transistor 89 out of conduction in FIG. 13. The voltage of the normal height $H_1$ of the forks FK set by the variable resistor $VR_1$ is applied to the servo system 76 as the designated value Hset. At this time, the other transistors 75 and 79 are ON thereby applying no voltages of the heights $LH_1$ through $LH_3$ and h. When the height of the forks FK becomes a value within the allowable error of the terminal height $H_1$, the output of the AND circuit 63 becomes "1" thereby advancing the counter 56 to the step 7.

The signal for designating the gate 7 is applied to the OR circuits 60, 62 and 63 thereby causing the normal height signal $H_1$, the signal START and the signal CE to become "1". At this time, the signal U/D is "0" thereby designating the subtraction. Accordingly, the truck will start to travel in reverse direction, so that the counter 64 will start to make subtraction from the value of the distance $L_1$ toward 0. When the output X1 of the digital-analog converter 65 becomes smaller than the value corresponding to the distance $L_1$, the function of the steering angle Ys is generated in opposite direction to the step 1 from the function generator 66, so that the truck FL will turn toward the station while travelling in reverse direction. When the counted value of the counter 64 becomes 0, it means that the truck returns to the original station. This is detected by the NOR circuit 90, which thereby produces an output signal Lo, which is applied to an AND circuit 91 in FIG. 10. Since the signal of the step 7 is applied to the AND circuit 91, when the truck FL returns to the station, the circuit 91 will product the output "1" thereby advancing the counter 56 to the step 8.

The signal for designating the step 8 is fed back to the counter 56 to reset it. When the counter 56 is reset, the output of the step 0 becomes "1", and the automatic travelling/sequence signal AUT/SEQ becomes also "1" thereby designating the automatic travelling along the leader cable of the truck. When the signal AUT/SEQ is "0", it designates implementation of the sequence. The signal AUT/SEQ ("1") is applied to the reset input of the up-down counter 64 thereby resetting the counter 64 to "0".

Since the OR circuit produces an output "0" at the steps 2, 4 and 6, the signal START is "0" thereby stopping the travelling of the truck FL. Simultaneously, the output of the inverter 92 becomes "1", and the stop designation signal STOP becomes 37 1". Thus, the braking control actuator 33 (see FIG. 4) is driven thereby braking the truck to stop.

The loading/unloading work sequence has thus been performed as has heretofore been described. For example, the lift truck FL which has loaded the goods at the rack 10 in FIG. 1 corresponding to the station $S_2$ has completed the loading work sequence, and will again be caused to travel under the control of the leader cable 15 and will then stop at the station $S_4$. Then, the truck FL will unload the goods at the station $S_4$ in accordance with the unloading work sequence as has previously been described in such a manner that unloads the goods at the exit 11a of the machine tool 11. Then, the truck FL may load the products or parts machined thereat by the machine tool 11 onto the forks FK and may then suitably store the products or parts in the rack 10 under the control of the sequence as has been described.

Figure 16:
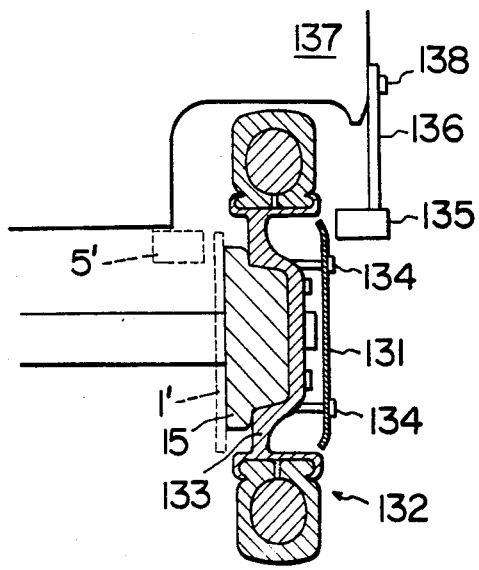
FIG. 16 is a side sectional view of one example of the vehicle speed detection sensor.
Figure 17:
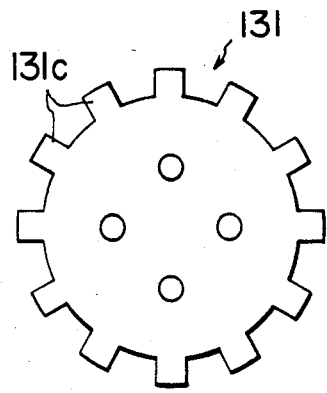
FIGS. 17 and 18 are views of one example of the disc of the vehicle speed detection sensor illustrated in FIG. 16.

The vehicle speed detection sensor for detecting the travelling speed of the truck (and accordingly the travelling distance thereof) is constructed as follows:

In FIG. 16, a disc 131 is fixedly secured to a rim 133 of a rotatable wheel 132 by a plurality of screws 134 so as to rotate integrally with the wheel 132. This disc 131 may be constructed of a thin metal plate such, for example, as an iron plate in such a manner that it will have having substantially the same diameter as the outer diameter of the rim 133. As indicated in FIG. 17, the peripheral portion of the disc 131 is constructed to have a gear shape in such a manner that a predetermined member of equi-distant teeth 131c are integrally formed by a punching work or the like. A rotation detector 135 is fixedly secured through a support member 136 to a body 137 at a position slightly spaced apart from the teeth 131c of the disc 131 by means of a plurality of screws 138. The aforesaid detector 135 comprises a detecting coil (not shown) for electromagnetically detecting the teeth 131c of said disc 131 thereby producing a signal corresponding to the revolution of the disc 131. This signal is proportional to the travelling distance of the truck FL, and the speed or travelling distance of the truck can accordingly be detected based on this signal.

Figure 18:
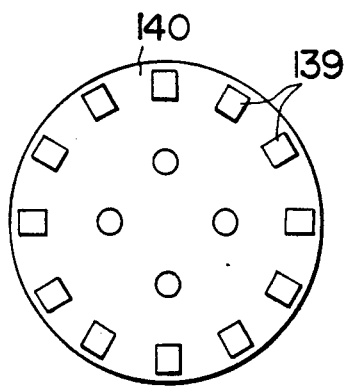

In this embodiment shown, the foregoing description has been made with respect to a case where the revolution of the disc is electromagnetically detected. Alternatively a disc 140 such as illustrated in FIG. 18 may be employed which has a predetermined number of equidistant reflecting tapes 139 adhered on the outer peripheral portion thereof instead of the toothed gear shape. The revolution of the disc 140 can be detected by irradiating light to the reflection tapes and receiving the reflected light from the reflecting tapes by a photoelectric detector (not shown) having a photoelectric element. A proximity switch may also be adopted for the same purpose.

The fork height detector unit for detecting the height of the forks FK of the truck FL may, for example, be so constructed that it will have a device as illustrated and described in the following:

This unit or device is constructed to comprise a rotary potentiometer mounted between the lift cylinder of the lift truck FL and the end of the cylinder rod through a wire in such a manner that the potentiometer is rotated in response to the telescopic movement of the cylinder rod with respect to the lift cylinder for generating the signal corresponding to the position of the forks FK of the truck FL.

Figure 19:
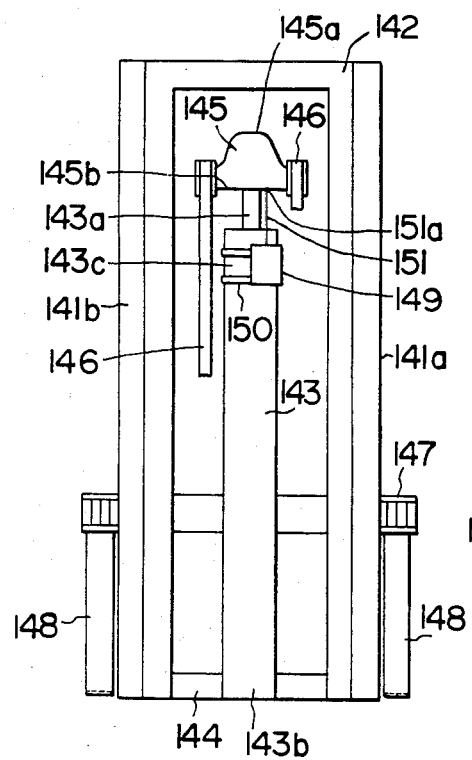
FIG. 19 is a back view of the fork assembly of the lift truck showing one aspect of the fork height detection device.

FIG. 19 illustrates a back view of the mast assembly mounted with the detecting device. An inner mast 142 is constructed to elevationally slide up and down between the left and right outer masts 141a and 141b. A lift cylinder 143 is supported at the bottom 143b by a lower stay 144 and the upper end of a piston rod 143a is fixedly secured to a chain wheel shaft 145. As the piston rod 143a rises, it upwardly urges the inner mast 142 and simultaneously pull chains 146 wound around the chain wheel shaft 145 upwardly to pull up the forks 148 through finger boards 147. In this arrangement, a distance h that the top 145a of the chain wheel shaft 145 travels until it reaches the inner mast 142 upon the telescopical extending movement of the rod 143a can be called "free lift length". In this way, the forks 148 may be pulled upwardly without an upward movement of the of the inner mast 142. After the top 145a of the wheel shaft 145 has contacted with the inner mast 142, the rod 143a will lift the form 148 while lifting the inner mast 142 together therewith as it telescopically extends upwardly from the lift cylidner 143. A position detector 149 is secured to the top 143c of the cylinder 143 through and engaging belt 150. The end 151a of a wire 151 extending upwardly from the position detector 149 is secured to the bottom 145b of the chain wheel shaft 145. This wire 151 functions to rotatably drive the rotary potentometer 163 (see FIG. 20) in response to the telescopical movements of the rod 143a relative to the cylinder 143.

Figure 20:
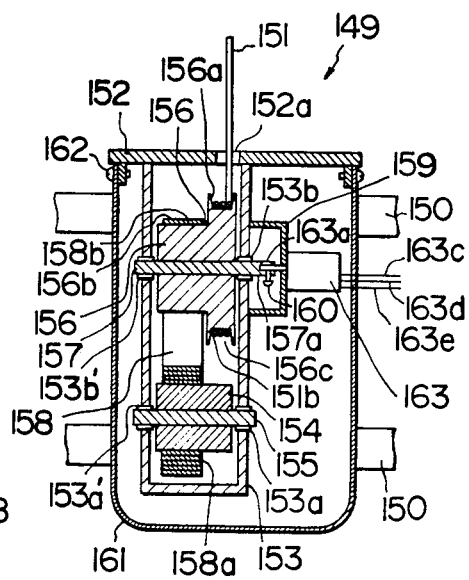
FIG. 20 is a rear elevational view of one example of the position detector depicted in FIG. 19, partially in cross section to illustrate the relative positioning of the various parts.

As shown in FIG. 20, the position detector 145 comprises a base plate 152, a frame 153 secured to the base plate 152, a shaft 155 of a spring take-up drum 154 is rotatably journalled by bearings 153a, 153a" and a shaft 157 of a wire take-up drum 156 rotatably journaled by bearings 153b, 153' mounted to the frame 153. The spring take-up drum 154 and the wire take-up drum 156 are respectively secured to the shafts 155 and 157 and intergrally rotatable therewith. A wire take-up reel portion 156a is formed at one side of the wire take-up drum 156, and a groove 156c is formed around the reel portion 156a. Take-up spring 158 is arranged between the spring take-up drum 154 and the wire take-up drum 156 and is so secured at one end 158a to the spring take-up drum 154 and at the other end 158b onto the reel 156b of the wire take-up drum 156 as to be wound on the spring take-up drum 154 in e.g. a clockwise direction and also to be always tensioned by resiliency thereof to rotate the wire take-up drum 156 in clockwise direction. The wire 151 is secured at one end 151b to the bottom of the groove 156c of the wire take-up reel portion 156a and at the other end 151a to the chain wheel 145 through the hole 152a of the base plate 152 as previously described so that the wire 151 normally is taken up in conclutions within the groove 156c of the reel portion 156a in clockwise direction by a take-up force caused by the take-up spring 156.

When the end 151a of the wire 151 is tensioned with a force exceeding the take-up force of the take-up spring 158, the wire take-up drum will rotate in counterclockwise direction to take up the take-up spring 158 causing the spring take-up drum 154 to rotate in counterclockwise direction. If the force for pulling the wire 151 becomes weaker than the take-up force of the take-up spring 158, the wire is taken up on the wire take-up reel portion 156a as has been heretofore described. The rotary potentiometer 163 is secured to the frame 153 through fitting 159. The rotatable shaft 163a of the rotary potentiometer 163 as directly entered the hole 157a axially formed substantially at the center of one end of the shaft 157 of the wire take-up drum 156 and is fixedly secured to the shaft 157 by a lock nut 160. Accordingly, the rotatable shaft 163a is integrally rotated with the wire take-up drum 156. The rotary potentiometer 163 is adapted to produce a signal responsive to the rotation of the rotatable shaft 163a in such a manner that it will produce, for example, an output "0" when the wire take-up drum 15 is fully rotated in clockwise direction, i.e., the wire 151 is fully taken up, and produce a output becoming greater in response to the extension of the wire 151. The output signal from the rotary potentiometer 163 is connected through lead wires 163c to 163e to a predetermined control device (not shown). A cover is secured to the base plate 152 by means of lock nuts 162 for protecting the respective mechanism of the rotary potentiometer 163.

Such position director 149 is fixedly secured to the lift cylinder 143 as has been hereinafter described, and the end 151a of the wire 151 is secured to the chain wheel 145. In this case, the mounting position of the position detector 149 is adjusted to a position where the rod 143a of the lift cylinder 143 is fully contracted so that when the forks 148 are lowered to the lowermost position, the wire 151 is taken up on the wire take-up drum 156 completely resulting in zero output of the rotary potentiometer 163.

Accordingly, the signal corresponding to the extension of the rod 143a of the lift cylinder 143 can be detected. In addition, the signal responsive to the height of the forks 148 can be accurately and quickly detected.

Figure 21:
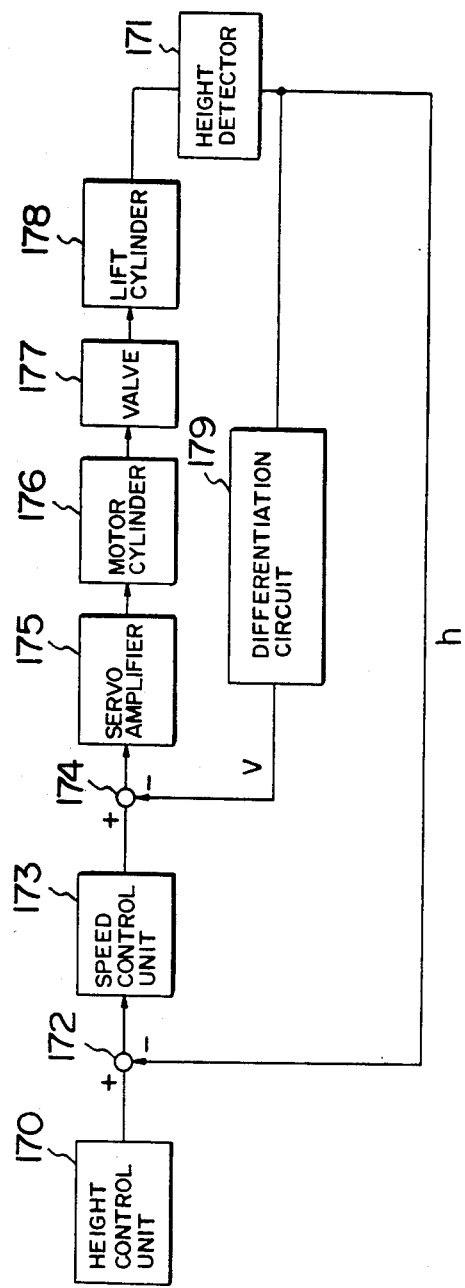
FIG. 21 is a block diagram of one example of the fork lifting and lowering elevation control device.

The control device as shown in a block diagram in FIG. 21 may be employed as the fork lifting control of the lift truck.

In FIG. 21, a height control unit 170 consisting of a variable register or the like serves to preset the height of the forks FK of the lift truck FL for producing a signal H of a value corresponding to the set height and applying it to a first signal mixer 172. On the other hand, a height detector 171 is provided at a suitable portion of the lift truck, e.g. (not shown) at the lift cylinder, mast or the chain wheel. As this height detector, the devices disclosed in FIGS. 19 or 20 may be employed. The height detector 171 performs the function of detecting the height of the forks FK thereby applying a height feedback signal h representing the height to the first mixer 172, which consists of a subtractor, a bridge circuit or the like for comparing the set signal H from the height control unit 170 with the feedback signal h thereby producing difference (H−h) between the signals H and h. The output signal (H−h) is applied to a speed control unit 173. This speed control unit 173 functions to set the lifting speed of the forks FK as represented by a value V=K(H−h), where K is a constant of proportion, proportional to the signal (H−h), as a target speed. More specifically, the set value V becomes positive when the height set value H is larger than the feedback signal h, and becomes negative when the set value H is smaller than the feedback signal h, wherein the absolute value of the set value V is difference between the feedback signal h and the set value H. The polarity of the set value V determines the lifting or lowering of the forks FK. When the set value V is positive, the forks FK are lifting, while when the set value V is negative, the forks FK are lowering. The objective value of the lifting an lowering speed of the forks FK can be given by the absolute value of the set value V. The set value V of the speed control unit 173 in applied to a second signal mixer 174. The output of the height detector 171 is differentiated by a differentiation circuit 179 and thereafter it applied to the mixer 174. Accordingly difference between the set value V and the feedback signal v representing the lifting or lowering speed of the forks FK is produced by the mixer 174. A second signal mixer 174 is constructed in the same manner as the first signal mixer 172. Therefore, the difference signal (V−v) representing difference between the set value V and the speed feedback signal v is applied to a servo amplifier 175. This servo amplifier 175 produces its output of the control signal in such a manner that the absolute value of the applied signal (V−v) becomes smaller (toward 0) to cause a motor cylinder 176 to control a valve 177 by the control signal therefrom thereby controlling the switching and flowing of hydraulic oil or fluid to a lift cylinder 178. The motor cyliner 176 is constructed to, for example, telescopically extend or contract elevationally up and down with a neutral point of the cylinder rod as a center in response to the output of the servo amplifier 175 in such a manner that when the cylinder rod moves downwardly from the neutral point, the port position of the valve 177 is so switched as to lift the forks upwardly and when the cylinder rod moves upwardly from the neutral point, the port position of the valve 177 is so switched as to lower the forks downwardly. The flow rate control is conducted through the valve 177 in accordance with the displacement of the cylinder rod from the neutral point thereby controlling the lifting or lowering speed of the forks FK.

The operation of the control device will now be described hereinbelow:

The height H is set at the height control unit 170. Assume that the relationship between the set height H and the height feedback signal h in magnitude be h<H. In this case, the output of the first signal mixer 172 becomes (H−h) (>0). Positive value V proportional to the signal (H−h) is set at the speed control unit 173. Since the polarity of the set value V determines the lifting or lowering direction of the forks FK as has heretofore been described, and the absolute value of the set value V becomes the target value of the lifting or lowering speed of the forks FK, the lift cylinder 178 may be feedback-controlled to lift the forks FK through the servo amplifier 175, motor cylinder 176 and value 177 with the signals from the differentiation circuit 179 as the speed feedback signal and may simultaneously control to follow up the lifting speed of the forks FK to the target value.

Since the set value V (=K(H−h)) of the aforesaid speed control unit 173 becomes smaller as the actual height h of the forks FK approaches the height set value H, the forks are so controlled as to accelerate the lifting speed of the forks when the difference between the set height H and the actual height h is large, as to decelerate the lifting speed of the forks when the forks approaches the set height H and to stop the lifting forks to 0 when the height of the forks coincides with the set height H. In the event that the set value H of the height control unit 170 is smaller than the actual height h of the forks, i.e., H<h, the signal (H−h)<0 is applied to the speed control unit 173 so as to set the negative value V proportional to the signal (H−h). Accordingly, the forks FL may be so controlled as to lower the forks to the target speed set value V, to decelerate the lowering speed of the forks as the forks approach the set height H and to stop the lowering forks to 0 when the height of the forks coincide with the set height H.

It should be understood from the foregoing description that if the target value of the lifting or lowering speed of the forks is set in response to the difference between the preset height and the feedback signal of the actual height so as to control the feedback of the height, two controls of the height and the lifting or lowering speed of the forks can be simultaneously controlled with a single control system.

In the embodiment described above, if the height of the forks is even slightly changed such as by the travelling of the truck after the forks FK of the truck FL are so controlled in the lifting or lowering height to the preset height H, this is detected by the height detector 171 so as to correct it with the result that the height of the forks cannot be maintained stable. For this reason, there may be adopted a device for resetting the signal applied to the servo amplifier when the height of the forks coincides with the preset height and also for prohibiting the servo mechanism even if the height of the forks is slightly varied after the control. This device may be constructed to have a limit switch for detecting the neutral point at the cylinder shaft of the motor cylinder 176 in the above embodiment for resetting the input of the servo amplifier by the output of the limit switch. It is to be noted that if a new value is provided for the height control unit, the input of the servo amplifier is again set thereby, and means for lifting or lowering control of the forks can, of course, be provided for the newly preset value.

Block Control of Loading/Unloading Vehicle

As shown in FIG. 2, this embodiment comprises a plurality of fork lift trucks, and the control systems of the respective lift trucks are formed in every block $B_1$ through $B_n$. The control systems are different depending upon the blocks, and respective control systems are connected through the terminal units $20_1$ through $20_n$ to one central control device. Since all the blocks $B_1$ through $B_n$ are controlled by one central control device, even if the leader cables belonging to different belocks interfere each other in the portion forming one course (such as, for example, the leader cables 16 and 13, 15 in FIG. 1), this can be smoothly controlled.

If such block control system is utilized in an arrangement for the concentrated management of a plurality of lift trucks $FL_1$ through $FL_n$, since the common frequencies of the respective blocks can be used except the portion where a plurality of courses are overlapped in a plurality of blocks, the number of frequencies to be used for the entire constitution can be reduced to a minimum. In addition, the devices for the unmanned operatorless cargo carried on the plural trucks can be used common and standardized. Since the data transmission line 21 can be adopted in a time-division manner, the number of lines can be greatly reduced. It becomes easy to feedback the storage state of the goods on the rack 10 in the respective blocks or the travelling state of the trucks through the terminal units $20_1$ through $20_n$ and the transmission line 21, all the concentrated management including the stock managing can be achieved with one central control device.

The control system of this invention comprises an obstacle contact sensing device for sensing the contact of the obstacle with the truck so as to prevent the collision of the truck against the obstacle in advance.

Figure 22:
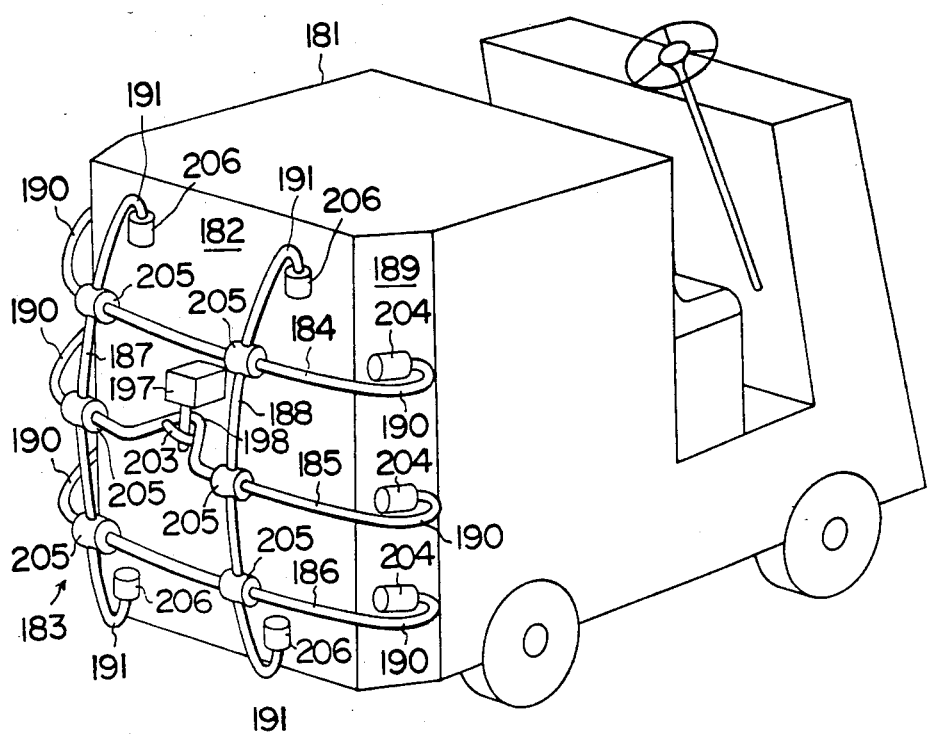
FIG. 22 is a perspective view of the fork lift truck provided with one example of a bumper device capable of sensing the contact of an obstacle with the lift truck to prevent the truck from colliding with the obstacle.

FIG. 22 shows one example of the obstacle contact sensing device constructed according to the present invention.

A bumper member 183 is disposed at a rear portion 182 of a body 181 of unmanned operatorless fork lift truck FL. This bumper member 183 consists of lateral bumper elements horizontally arranged with respect to the body 181 having an upper bumper element 184, an intermediate bumper element 185 and a lower bumper element 186, and two vertical bumper elements 187 and 188 arranged elevationally with respect to the body 181. The lateral bumper elements 184, 185 and 186 are smoothly projected from the rear portion 182 of the body 181 in a bending manner. Ears 190 are formed in both side portions 189 of the elements and the respective lateral bumper elements are mounted to both side portions 189 with fittings 204.

The vertical or elevational bumper elements 187 and 188 are arranged perpendicularly to the lateral bumper elements 184, 185 and 186 so as to be connected to the respective lateral bumper elements 184, 185 and 186 with connecting members 205 at the intersections. The upper and lower portions of the elevational bumper elements 187 and 188 are bent upwardly and downwardly in a convex manner so as to form ears 191, and the respective elements are mounted to rear portion 182 with fittings 206. It should be understood from the foregoing description that the relationship between the lateral bumper elements 184, 185 and 186 and the elevational bumper elements 197 and 185 is to provide a sufficient strength for the bumper member 183 and also to permit a partial deformation to affect the entire bumper elements. The bumper members 183 are so mounted over the body 181 in a projecting manner that the upper and lower, and both side portions are bent by a predetermined amount. These bumper members 183 are made of suitable flexible material, and such construction of the respective lateral and elevational bumper elements enables the entire bumper elements to be easily deformed against vertical, horizontal and oblique external stresses acting against a part or whole of the elements and to be restored to the original structure when the external stresses are removed therefrom.

Instead of using the connecting members 205 for connecting the lateral bumper elements 184, 185 and 186 to the elevational bumper elements 187 and 188, the bumper elements may be welded for connection if they are made of metal, or connecting wire or metal sheet may be used.

Figure 25:
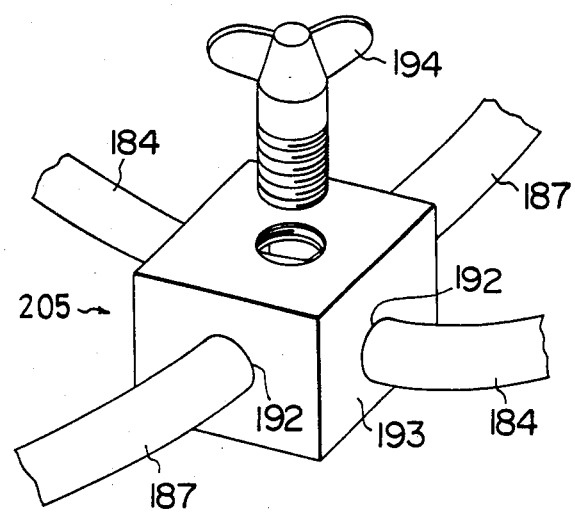
FIG. 25 is a perspective view of one example of the holder used for longitudinally and laterally connecting the bumper device indicated in FIG. 22.
Figure 26:
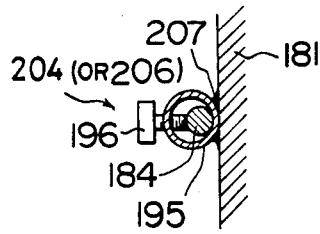
FIG. 26 is a detail view in partial cross-section of one example of the fittings utilized for mounting the device shown in FIG. 22 to the lift truck.

As shown in FIG. 25 in an enlarged scale, a cubic holder 193 formed with holes 192 through which the lateral and elevational bumper elements 184, 185, 186, 187 and 188 are inserted may be used as the connecting member. A butterfly bolt 194 is used for tightening the bumper elements inserted through the holes of the cubic holder 193. The connection of the butterfly bolt 194 to the holder 193 is a matter of design and may accordingly adopt any conventional manner within the scope of the present invention. The connection of the bumper elements to the body 181 through the ears 190, 191 formed at the upper and lower ends and both sides of the elements may be made in various ways. As illustrated in FIG. 26 showing one example of fittings 204 and 206 generally depicted in FIG. 22, a pipe 195 for mounting the bumper elements to the body 181 is used in such a manner that the pipe 195 is welded to the body 181 in advance, the ends of the respective bumper elements 184 are then inserted into the pipe 195 welded in advance to the body 181 and are then secured to the pipe 195 with fastening means such as a bolt 196. The bumper elements may also be directly welded to the body 181.

Figure 23:
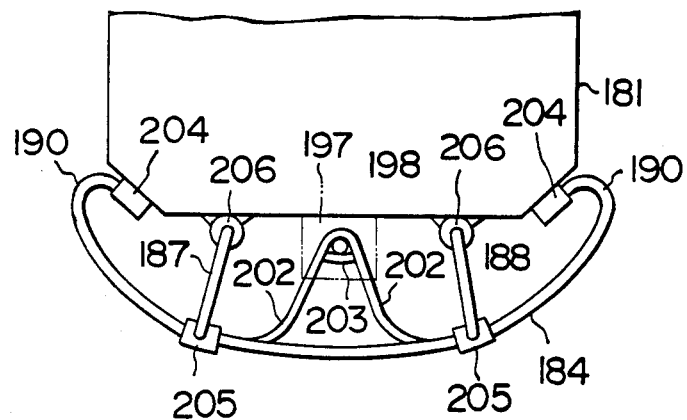
FIG. 23 is a plan view of the device shown in FIG. 22.
Figure 24:
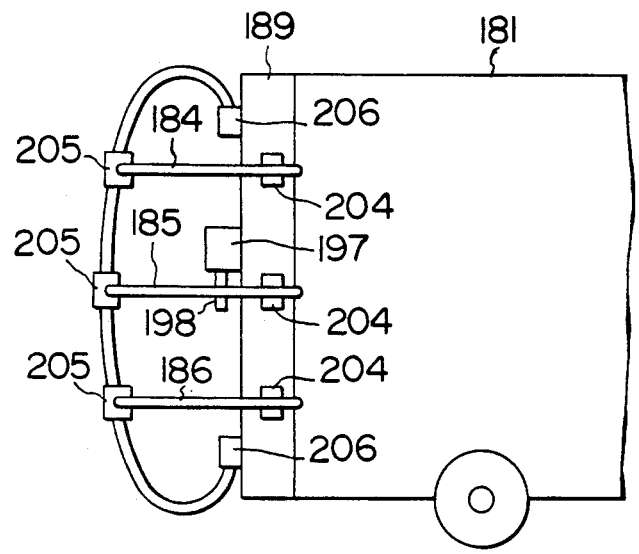
FIG. 24 is a side view of the device illustrated in FIG. 22.

A limit switch 197 may be fixedly secured to about the center of the rear portion 182 of the body 181 of the truck FL in such a manner that a movable member 198 of the switch 197 is engaged with a ring portion 203 of the bumper members 183 (see FIG. 23). The movable member 198 of the switch 197 is made of a coil spring and is so constructed as to be readily bendable in all directions by a slight force.

The limit switch 197 is so constructed as to be actuated even by a slight bending in any direction of the movable member 198. Such limit switch can be readily obtained. In the embodiment described above, the central portion of the lateral bumper element 185 is bent toward the limit switch movable member 198 to form a guide portion 202, and the ring portion 203 is formed in the guide portion 202 by attaching a proper bent piece across the guide portion.

While the lift truck FL is travelling in reverse direction, if the bumper member 183 slightly contacts with an obstacle without being noticed by the operator, the entire bumper members 183 are more or less deformed. The ring portion 203 is accordingly deformed by the entire deformation of the bumper members 183, and the movable member 198 of the limit switch 197 is mechanically deformed so that the limit switch 197 becomes ON. Since this limit switch 197 is connected to a control circuit (not shown) a control signal is produced for actuating a brake actuator whereby the body 181 is stopped resulting in prevention of the body 181 from colliding with the obstacle. Simultaneously, the contact is informed to the operator by a warning lamp, buzzer or the like. If the obstacle is removed and the bumper members 183 are brought out of contact with the obstacle, the bumper members 183 are restored to the original configuration and the deformation of the movable member 198 is also removed. As a result, the obstacle sensing limit switch 197 also becomes OFF. Thus, the brake of the truck is released and the truck is again started by the starting command.

The foregoing description has been made with respect to a case where the obstacle sensing bumper device is provided at the rear portion 182 of the body 181 of the truck FL. The device may also be provided at the front portion or body sides in a suitable manner depending upon the type or shape of the truck.

In the aforementioned embodiment, for convenience of explanation, the description has been made with reference to a case where the respective bumper elements 184, 185, 186 187 and 188 are laterally and elevationally provided over the body 181, but the bumper elements may be formed diagonally over the body 181. In this case, material required for making the bumper elements can be saved.

A device using an acoustic oscillator can be utilized for the obstacle sensing device. In this device, the acoustic oscillator is disposed at the obstacle or other trucks, or is carried by the operator working in the work area while the obstacle sensing device is provided for the unmanned operatorless lift truck for detecting the acoustic wave from the acoustic oscillator so as to conduct an emergency stop in danger.

Figure 27:
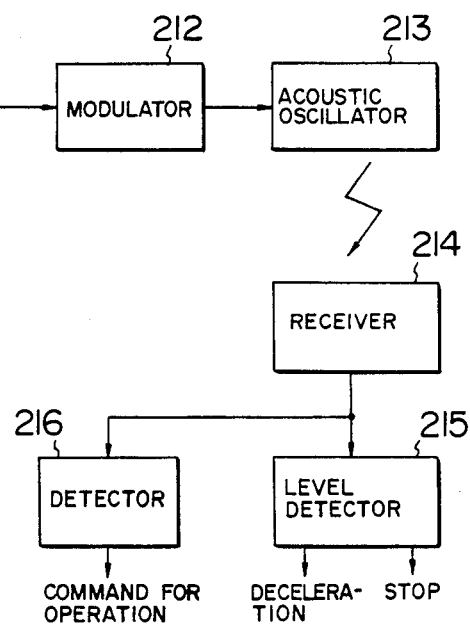
FIG. 27 is a block diagram of one example of the bumper device employing an acoustic oscillator.

One example of this device is shown in block diagram in FIG. 27.

As regards the obstacles formed by a human being or other fork lift trucks, a signal from a signal generator 211 is modulated by a modulator 212 thereby rendering an acoustic oscillator 213 to operate to produce an acoustic signal. This acoustic signal from the acoustic oscillator 213 is received by a receiver 214 mounted to the unmanned operatorless lift truck. The output of the receiver 214 is applied to a level detector 215 which detects the level of the received signal from the receiver 214 thereby stopping or decelerating the truck. More particularly, when the level of the detector 215 is low, the truck is decelerated. When the level is higher than a predetermined level, the truck is stopped. Since the acoustic signal has a large attenuation factor with respect to the distance, even if the distance displacement is small, the device would be effective because the displacement is detected as the variation of the signal level. The modulated signal from the receiver 214 is also applied to a detector 216 for detection. This signal used for issuing a command such as change is direction to the unmanned lift truck.

By providing such acoustic oscillator on the obstacle or other lift trucks or by having it carried by the operator, the unmanned operatorless lift truck will detect this acoustic signal from the acoustic oscillator to render the truck to operator a predetermined sequence, and collision of the unmanned operatorless lift truck against other vehicle or trucks or persons can be prevented. By modulating the acoustic signal, a forward or reverse travelling command may be provided for the unmanned operatorless lift truck.

The foregoing description has been made with respect to a case where a conventional fork lift truck is modified according to the invention without an operator, the unmanned operatorless vehicle to be employed in the present invention is not limited to this. For example, a special fork lift truck to the sides of which the forks FK are mounted may also be adopted as the vehicle of this invention. In this case, the loading and unloading work sequence may suitably be altered depending upon the type of the vehicle to be used. Further, a turntable may be provided for each station, and the vehicle may be carried on the turntable to direct the vehicle toward the rack 10. In this case, it is not necessary to provide the 90° turning sequence of the vehicle. Moreover, it is also possible that the leader cable and the stations are provided along the course in such a manner that the turning sequence of the truck will be dispensed with. The type of automatically controlling the vehicle to travel along the predetermined course is not limited to means using the leader cable, but other suitable means may be employed.

What is claimed is:

1. An automatic control system for controlling a vehicle for automatically conducting the transportation, loading and unloading of goods in a work area comprising:

vehicle guideways consisting of a plurality of leader cables disposed in a work area and being capable of receiving instruction signals;

a plurality of stop stations provided at desired places along said vehicle guideways;

vehicle travelling control means which, in use, is carried by a vehicle to be controlled by said system, said travelling control means being responsive to instruction signals received by said leader cables for controlling travelling of said vehicle along said vehicle guideways from stop station to stop station; and pre-programmed loading and unloading control means which, in use, is carried by the vehicle carrying said travelling control means, the said loading and unloading control means taking over control of the vehicle from said travelling control means upon arrival of the vehicle at each stop station and controlling the entry of the vehicle to a set working position removed from the guideway, the loading and unloading of goods and the return of the vehicle from said working position to said guideway for further control of its travel therealong by said travelling control means.

2. An automatic control system as defined in claim 1 wherein said loading and unloading control means comprise:

station detection means for detecting said stations provided along said vehicle guideways;

working position entry control means for controlling entry of the vehicle from one of the stations to the set working position;

set working position detecting means for detecting said set working position; and lifting and lowering control means for controlling lifting and lowering of a working portion of said vehicle.

3. An automatic control system as defined in claim 2 wherein said set working position detection means comprise:

a counter for counting pulses produced in accordance with travel distance of the vehicle;

a first pick-up coil and a second pick-up coil for detecting the position of a set working position confirmation coil;

a first gate for producing a detection output when the output of said counter has reached a first predetermined value and said first pick-up coil has produced its detection output; and a second gate for producing a detection output when the output of said counter has reached a second predetermined value and said second pick-up coil has produced its detection output;

detection of the set working position being effected in response to the detection outputs of said first gate and said second gate.

4. An automatic control system as defined in claim 2 wherein said set working position detection means comprise a counter for counting pulses produced in accordance with travel distance of the vehicle and the set working position is detected by the count of said counter reaching a predetermined value.

5. An automatic control apparatus as defined in claim 1 wherein said loading and unloading control means comprise:

a counter which starts counting of pulses produced in accordance with travel distance of the vehicle upon detection of said station; and sequence control means for sequentially controlling starting, stopping, forward and reverse travelling and lifting and lowering of the working portion of said vehicle in response to the count of said counter.

6. An automatic control system as defined in claim 2 wherein said lifting and lowering control means comprise:

height setting means for setting a plurality of heights corresponding to a height of a working table;

minute height setting means for setting minute heights;

a height selection switching means for selecting the height of the working table;

a loading and unloading selection switching means for selecting loading or unloading of the goods; and a computation circuit for adding a height set by said height setting means and a minute height set by said minute height setting means together in response to switching of said height selection switching means and said loading and unloading selection switching means;

lifting and lowering control of said working portion of the vehicle being effected in response to the output of said computation circuit.

7. An automatic control system as defined in claim 1 wherein each of said stations comprises at least one loop coil energized by at least one power source of a plurality of power sources of respectively different frequencies and the respective stations are identified by a combination of frequencies and positive-phase energizing, negative-phase energizing and non-energizing of said coil.

* * * * *